United States Patent
Konno et al.

(10) Patent No.: US 12,271,522 B2
(45) Date of Patent: Apr. 8, 2025

(54) LINE-OF-SIGHT DETECTION DEVICE AND HEAD MOUNTED DISPLAY DEVICE

(71) Applicant: CANON KABUSHIKI KAISHA, Tokyo (JP)

(72) Inventors: Yoshihiko Konno, Tokyo (JP); Koichi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/395,406

(22) Filed: Dec. 22, 2023

(65) Prior Publication Data
US 2024/0211036 A1     Jun. 27, 2024

(30) Foreign Application Priority Data
Dec. 26, 2022   (JP) .................................. 2022-208202

(51) Int. Cl.
*G06F 3/01* (2006.01)
(52) U.S. Cl.
CPC .................................... *G06F 3/013* (2013.01)
(58) Field of Classification Search
CPC .  G06F 3/011; G06F 3/013; G02B 2027/0178; G02B 27/0093; G02B 27/017; G02B 2027/0138; G02B 2027/0132; G02B 13/18; A61B 5/163; A61B 5/6803; G06V 40/18; H04N 13/344; H04N 13/383
See application file for complete search history.

(56) References Cited

U.S. PATENT DOCUMENTS

| | | | |
|---|---|---|---|
| 11,138,429 B2 | 10/2021 | Eskilsson | |
| 2014/0078283 A1 | 3/2014 | Nistico | |
| 2015/0098620 A1 | 4/2015 | Wu | |
| 2015/0185503 A1* | 7/2015 | Tate | G02C 7/083 |
| | | | 351/159.01 |
| 2019/0278987 A1 | 9/2019 | Eskilsson | |
| 2022/0261079 A1 | 8/2022 | Tornéus | |

FOREIGN PATENT DOCUMENTS

| | | | |
|---|---|---|---|
| JP | 3186072 B2 | 7/2001 | |
| JP | 2020095205 A | 6/2020 | |
| JP | 2023170238 A | 12/2023 | |
| KR | 20240068647 A | * 5/2024 | |
| WO | 2022162276 A1 | 8/2022 | |

OTHER PUBLICATIONS

KR-20240068647-A (Year: 2024).*
The above patent documents were cited in a European Search Report issued on Apr. 19, 2024, a copy of which is enclosed, that issued in the corresponding European Patent Application No. 23219142.9.

* cited by examiner

*Primary Examiner* — Sanjiv D. Patel
(74) *Attorney, Agent, or Firm* — Cowan, Liebowitz & Latman, P.C.

(57) ABSTRACT

A line-of-sight detection device according to the present invention includes: a lens; an image sensor disposed on an edge of the lens; and a plurality of light sources disposed along the edge of the lens, wherein in a 360° range around an optical axis of the lens, a number of light sources per degree is the maximum in a range on opposite side of the image sensor with respect to the optical axis of the lens.

17 Claims, 23 Drawing Sheets

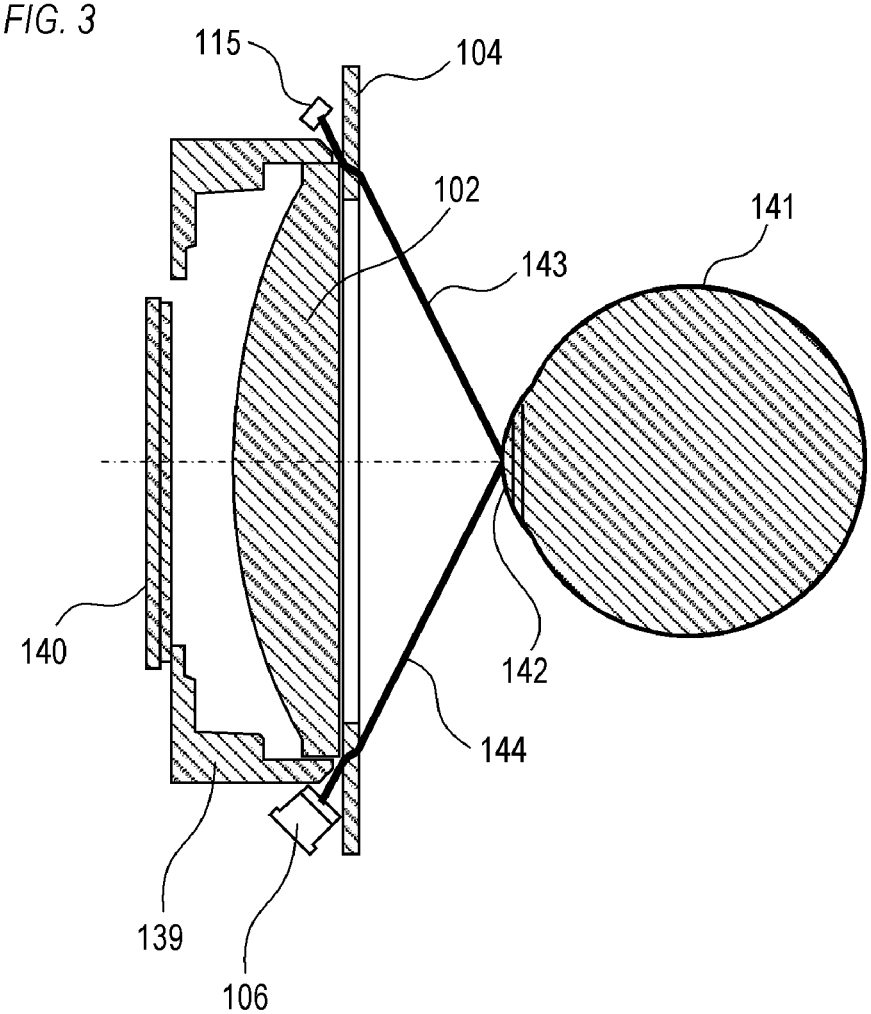

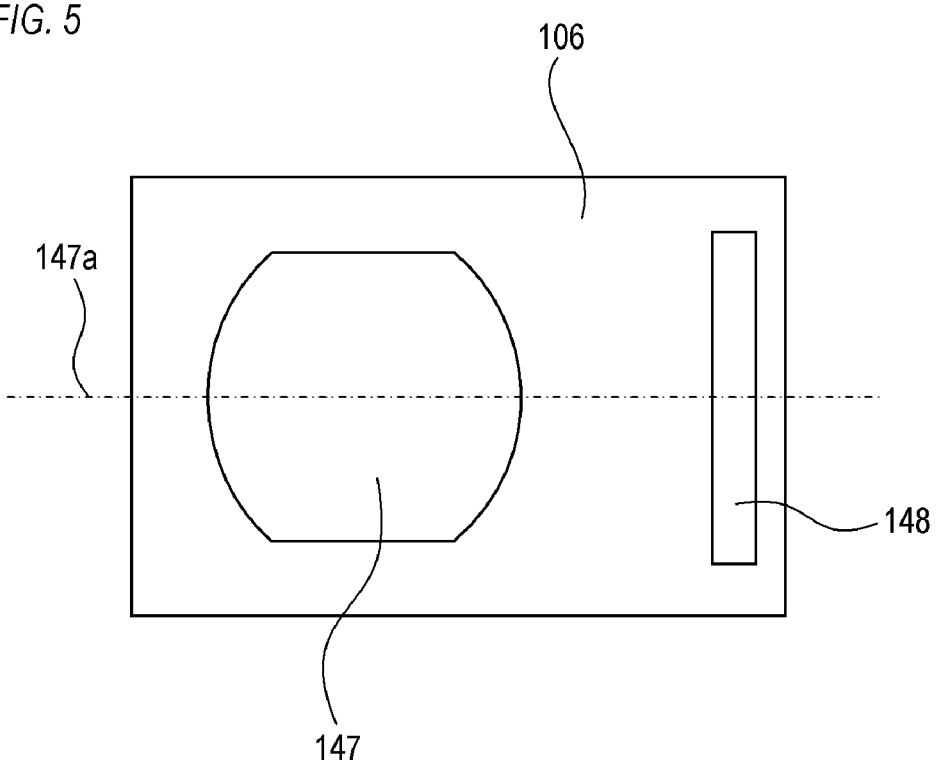

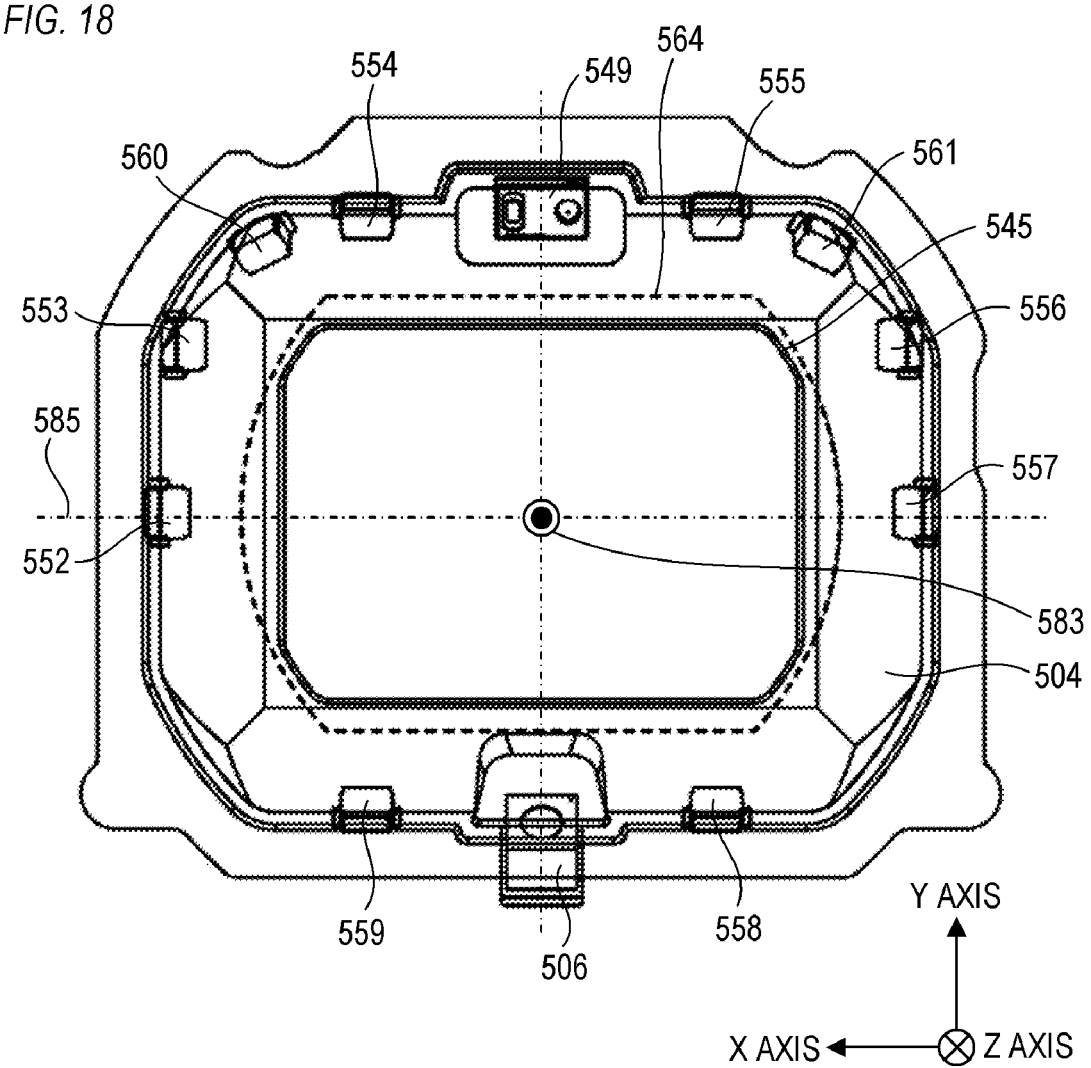

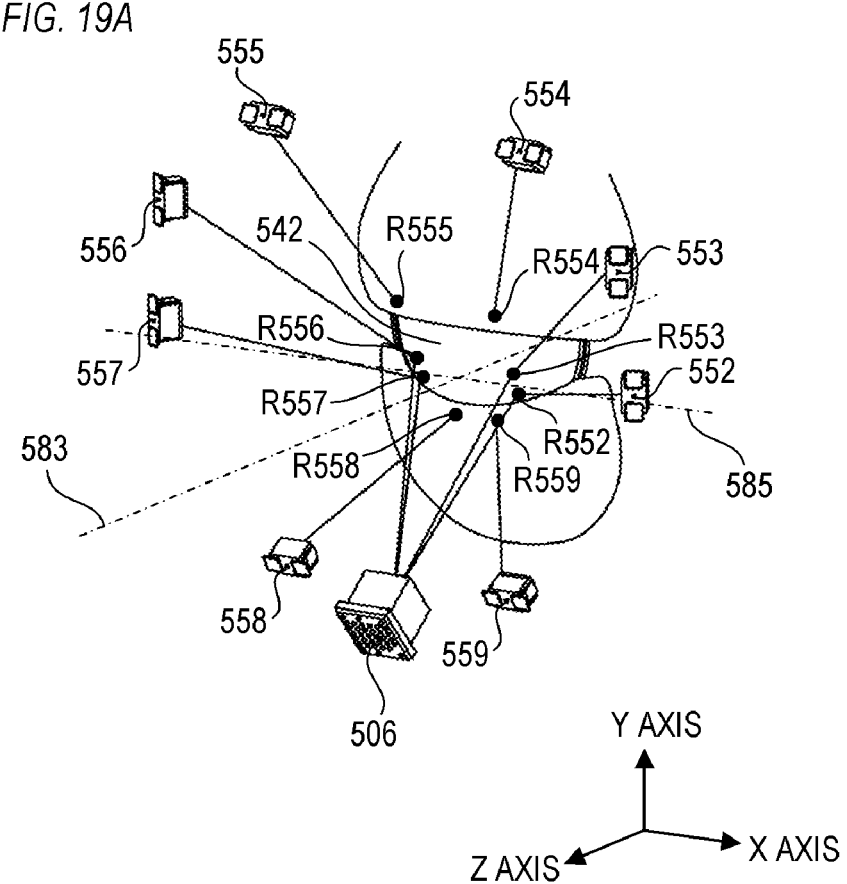

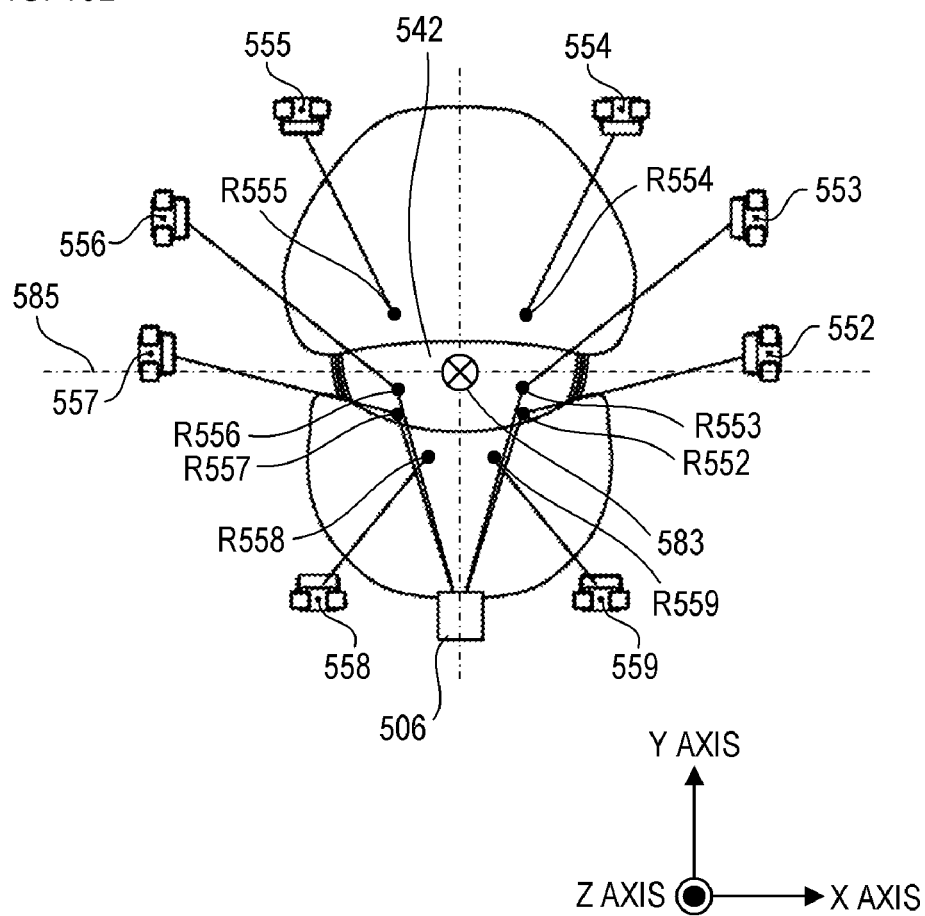

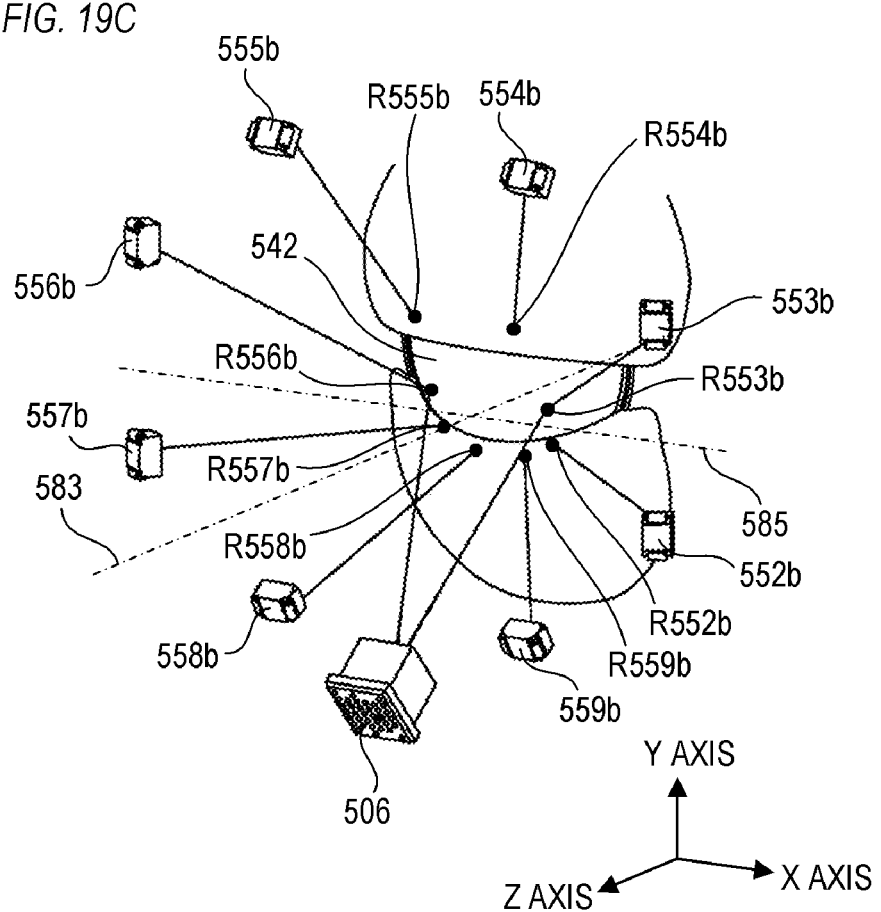

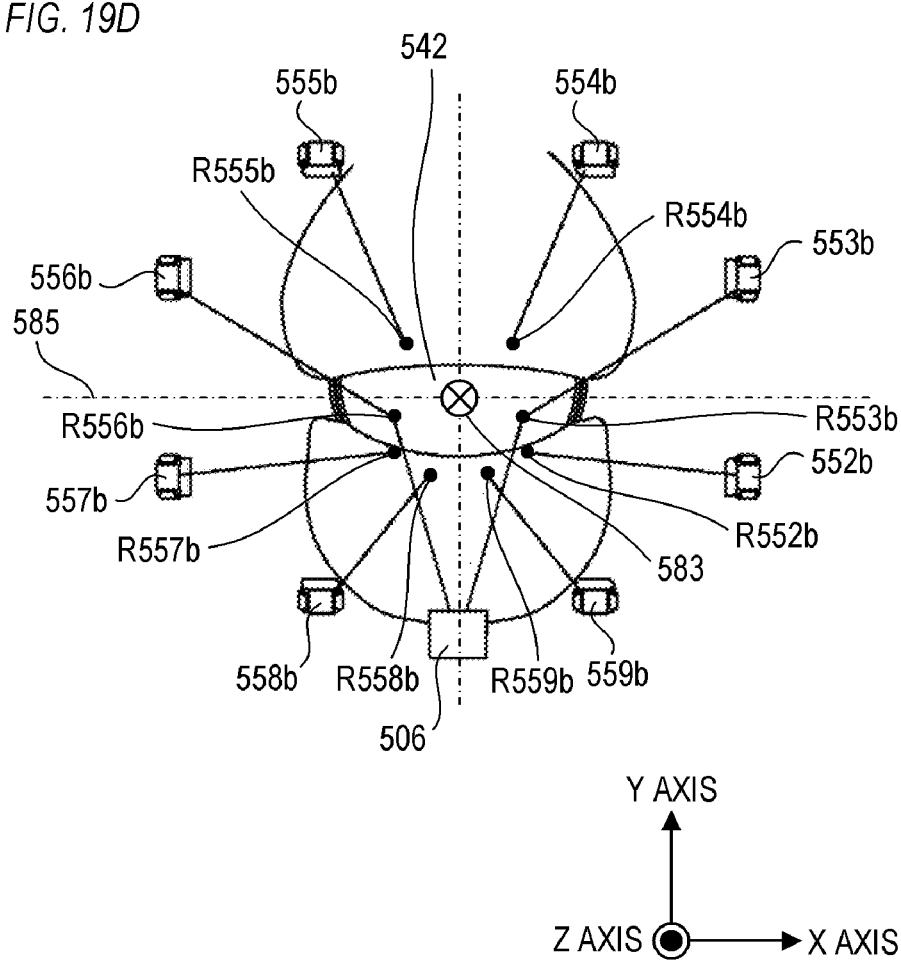

LINE-OF-SIGHT DETECTION DEVICE AND HEAD MOUNTED DISPLAY DEVICE

BACKGROUND OF THE INVENTION

Field of the Invention

The present invention relates to a line-of-sight detection device and a head mounted display device.

Description of the Related Art

Various electronic apparatuses that can detect a line-of-sight (line-of-sight position and line-of-sight direction) of the user have been commercialized. For example, in the fields of virtual reality (VR), augmented reality (AR) and the like, head mounted displays, which detect a line-of-sight position and perform such processing as menu selection based on the line-of-sight position, have been commercialized. Cameras and video cameras, which detect a line-of-sight direction and select a distance measurement point based on the detected line-of-sight direction, have also been commercialized.

In the line-of-sight detection, a line-of-sight sensor images an eye of a user, and acquires an image of the eye thereby. Here a light source disposed around an eyepiece optical system illuminates the eye of the user. The light from the light source is mirror-reflected on the surface of the cornea, and is captured as a corneal reflex image, that is, a Purkinje image, on the image acquired by the line-of-sight sensor. Based on the coordinates of the eyeball and the corneal reflex image in the image acquired by the line-of-sight sensor, a direction in which the eyeball of the user is turning is calculated, and the line-of-sight is detected thereby.

In the case of the conventional electronic apparatuses (line-of-sight detection devices), a plurality of light sources are disposed circling around an optical axis of a lens system (optical system). For example, U.S. Pat. No. 11,138,429 discloses an electronic apparatus in which a plurality of light sources circle around an optical axis of a lens system at approximately equal intervals.

However, in the case of the conventional line-of-sight detection (line-of-sight detection device), a Purkinje image may not be correctly captured in an image acquired by the line-of-sight sensor, and therefore the line-of-sight may not be detected at high precision.

SUMMARY OF THE INVENTION

The present invention provides a line-of-sight detection device which can detect a line-of-sight at high precision regardless the situation.

A line-of-sight detection device according to the present invention includes: a lens; an image sensor disposed on an edge of the lens; and a plurality of light sources disposed along the edge of the lens, wherein in a 360° range around an optical axis of the lens, a number of light sources per degree is the maximum in a range on opposite side of the image sensor with respect to the optical axis of the lens.

Further features of the present invention will become apparent from the following description of exemplary embodiments with reference to the attached drawings.

BRIEF DESCRIPTION OF THE DRAWINGS

FIG. 3 is a cross-sectional view of the display unit main body according to Embodiment 1;

FIG. 5 is a schematic diagram depicting an internal structure of a right line-of-sight sensor according to Embodiment 1;

FIG. 18 is a schematic diagram depicting an EVF unit according to Embodiment 5;

FIG. 19A is a perspective view indicating reflection positions of illumination light according to Embodiment 5;

FIG. 19B is a front view indicating reflection positions of illumination light according to Embodiment 5;

FIG. 19C is a perspective view indicating a comparative example of reflection positions of illumination light;

FIG. 19D is a front view indicating a comparative example of reflection positions of illumination light.

DESCRIPTION OF THE EMBODIMENTS

Embodiment 1

Embodiment 1 of the present invention will now be described with reference to FIGS. 1 to 5. In Embodiment 1, an example of a head mounted display equipped with a line-of-sight detection device will be described.

Figure 1:
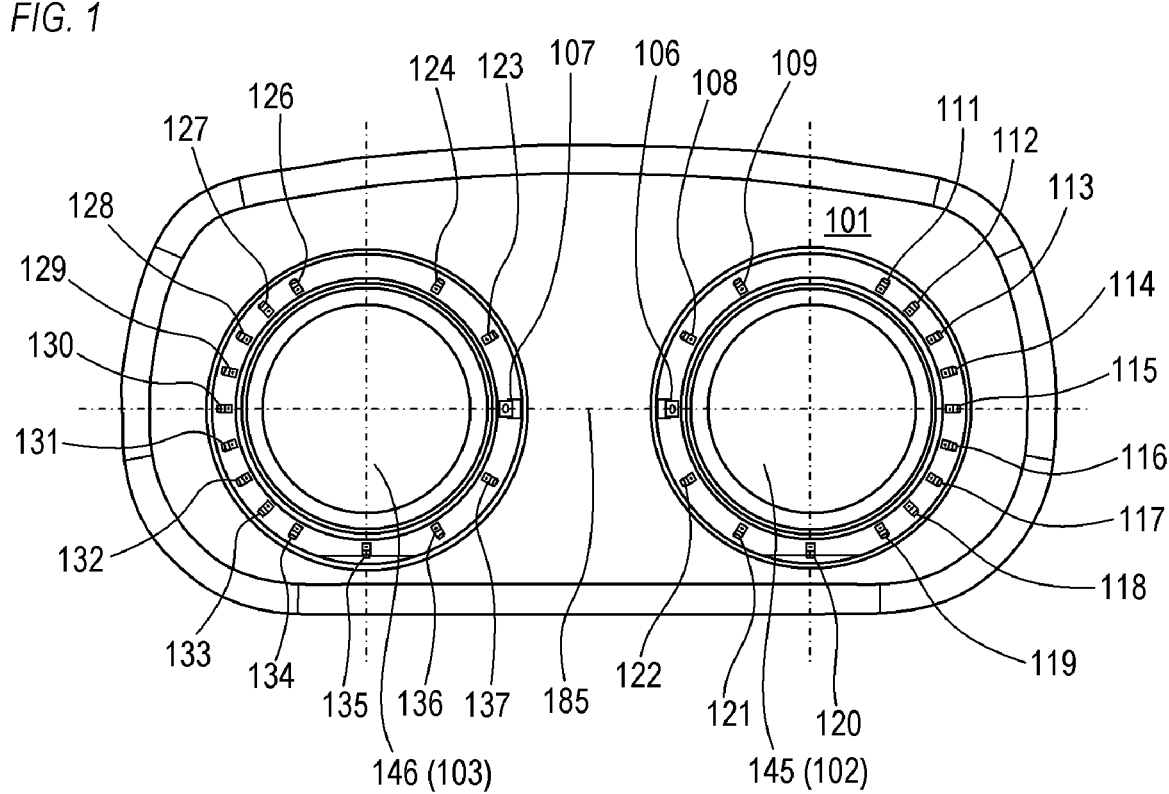
FIG. 1 is a rear view of a display unit main body according to Embodiment 1.
Figure 2:
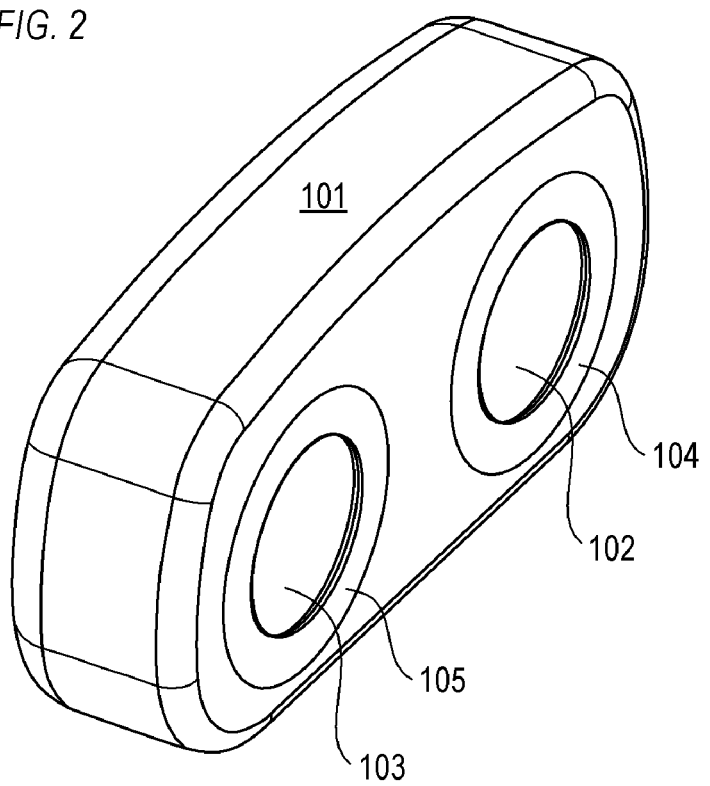
FIG. 2 is a perspective view of the display unit main body according to Embodiment 1.

FIG. 1 is a rear view of a display unit main body 101 of the heat mounted display according to Embodiment 1, and FIG. 2 is a perspective view of the display unit main body 101. FIG. 1 indicates a state viewing the display unit main body 101 from an eyeball side of a user (user wearing the head mounted display).

The display unit main body 101 includes a right opening portion 145 which limits a field-of-view of a right eye of the user, and a left opening portion 146 which limits a field-of-view of a left eye of the user. On the right opening portion 145 (inside the right opening portion), a right lens system 102, which is a display optical system, is disposed, and on the left opening portion 146 (inside the left opening portion), a left lens system 103, which is a display optical system, is disposed. The right opening portion 145 and the right lens system 102 are disposed to face the right eye of the user (user wearing the head mounted display). The left opening portion 146 and the left lens system 103 are disposed to face the left eye of the user (user wearing the head mounted display).

As illustrated in FIG. 2, an infrared transmitting window 104, which makes a later mentioned line-of-sight detection unit invisible from the outside, is disposed around the right lens system 102. In the same manner, an infrared transmitting window 105 is disposed around the left lens system 103. The line-of-sight detection is performed using infrared light (infrared rays). The infrared transmitting window 104 and the infrared transmitting window 105 are made from a material which does not transmit visible light but transmits infrared light. Thereby a structure which excels in aesthetics (the internal unit is invisible) and allows to perform the line-of-sight detection can be implemented. Even if some visible light can be transmitted, the internal unit cannot be visible if the transmittance of the infrared light is higher than the transmittance of this visible light, and thereby a similar effect can be implemented, but it is preferable that the transmittances (shield factors) are considerably different between the visible light and the infrared light. In the present description and the present invention, "transmitting the infrared light" is not limited to transmitting all of the infrared light that enters, but some infrared light may be shielded. In FIG. 1, the display unit main body 101 is in a state where the infrared transmitting window 104 and the infrared transmitting window 105 are removed, so that the internal unit is visible.

As illustrated in FIG. 1, a right line-of-sight sensor 106 is disposed on an edge of the right opening portion 145 (right lens system 102), so as to be directed to the right eye facing the right opening portion 145. In the same manner, a left line-of-sight sensor 107 is disposed on an edge of the left opening portion 146 (left lens system 103), so as to be directed to the left eye facing the left opening portion 146.

FIG. 5 is a schematic diagram depicting an internal structure of the right line-of-sight sensor 106. The right line-of-sight sensor 106 includes a line-of-sight sensor lens 147 and a line-of-sight sensor chip 148. Using an image formed on the line-of-sight sensor chip 148 by the line-of-sight sensor lens 147, an arithmetic operation to detect the line-of-sight is performed. The right line-of-sight sensor 106 is disposed such that an optical axis 147a (line-of-sight sensor lens optical axis) of the line-of-sight sensor lens 147 included in the right line-of-sight sensor 106 is directed to the right eye facing the right opening portion 145. The internal structure of the left line-of-sight sensor 107 is approximately the same as the internal structure of the right line-of-sight sensor 106. The left line-of-sight sensor 107 is disposed such that an optical axis 147a (line-of-sight sensor lens optical axis) of the line-of-sight sensor lens 147 included in the left line-of-sight sensor 107 is directed to the left eye facing the left opening portion 146.

Referring back to the description in FIG. 1, the right line-of-sight sensor 106 is disposed at the 9:00 position (position at 270° rotated clockwise from the position directly above), with the center of the right opening portion 145 (optical axis of the right lens system 102) as the center. The left line-of-sight sensor 107 is disposed at the 3:00 position (position at 90° rotated clockwise from the position directly above), with the center of the left opening portion 146 (optical axis of the left lens system 103) as the center. The right line-of-sight sensor 106 and the left line-of-sight 107 are disposed approximately at the same height (vertical position). The right line-of-sight sensor 106 is disposed on the left side of the right opening portion 145 (near the right eye), and the left line-of-sight sensor 107 is disposed on the right side of the left opening portion 146 (near the left eye).

In this way, the right line-of-sight sensor 106 and the left line-of-sight sensor 107 are disposed on a horizontal line 185 passing through the optical axis of the right lens system 102 and the optical axis of the left lens system 103 (on a horizontal line passing through the center of the right opening portion 145 and the center of the left opening portion 146).

Normally eyelids of a user (user wearing the head mounted display) open vertically. Therefore the right line-of-sight sensor 106 and the left line-of-sight sensor 107 are disposed such that the eyeballs are observed in the direction of the horizontal line 185, whereby the eyeballs are not shaded very much by the eyelids when the line-of-sight is detected, and the success rate of the line-of-sight detection can be improved.

In FIG. 1, a plurality of infrared light-emitting diodes (right IREDs) are disposed along the edge of the right opening portion 145 (right lens system 102) as a plurality of light sources to illuminate the eyeball (right eye). In the same manner, a plurality of infrared light-emitting diodes (left IREDs) are disposed along the edge of the left opening portion 146 (left lens system 103) as a plurality of light sources to illuminate the eyeball (left eye).

Around the right opening portion 145 (right lens system 102), right IREDs 108, 109 and 111 to 122 are disposed. With the center of the right opening portion 145 (optical axis of the right lens system 102) as the center, the right IRED 108 is disposed at the 10:00 position, the right IRED 109 at the 11:00 position, the right IRED 111 at the 1:00 position, the right IRED 112 at the 1:30 position, the right IRED 113 at the 2:00 portion, and the right IRED 114 at the 2:30 position. Further, the right IRED 115 is disposed at the 3:00 position, the right IRED 116 at the 3:30 position, the right IRED 117 at the 4:00 position, the right IRED 118 at the 4:30 position, the right IRED 119 at the 5:00 position, the right IRED 120 at the 6:00 position, the right IRED 121 at the 7:00 position, and the right IRED 122 at the 8:00 position.

Around the left opening portion 146 (left lens system 103), left IREDs 123, 124 and 126 to 137 are disposed. With the center of the left opening portion 146 (optical axis of the left lens system 103) as the center, the left IRED 123 is disposed at the 2:00 position, the left IRED 124 at the 1:00 position, the left IRED 126 at the 11:00 position, the left IRED 127 at the 10:30 position, the left IRED 128 at the 10:00 position, and the left IRED 129 at the 9:30 position. Further, the left IRED 130 is at the 9:00 position, the left IRED 131 at the 8:30 position, the left IRED 132 at the 8:00 position, the left IRED 133 at the 7:30 position, the left IRED 134 at the 7:00 position, the left IRED 135 at the 6:00 position, the left IRED 136 at the 5:00 position, and the left IRED 137 at the 4:00 position.

In Embodiment 1, out of the 360° range around the center of the right opening portion 145 (optical axis of the right lens system 102), a number of light sources per degree (angle density) is the maximum in the range on the opposite side of the right light-of-sight sensor 106, with respect to the center of the right opening portion 145. In FIG. 1, in the 120° range (±60° range) of which center is at the 3:00 position facing the 9:00 position where the right line-of-sight sensor 106 is disposed, 9 right IREDs are disposed at a 15° pitch (angle density: 0.0667 units/°. The 9 right IREDs are the right IREDs 111 to 119 which are disposed at the positions 1:00, 1:30, 2:00, 2:30, 3:00, 3:30, 4:00, 4:30 and 5:00. In the range other than this 120° range, the right IREDs are disposed at a pitch larger than the 15° pitch (smaller angle density than 0.0667 units/°).

A number of right IREDs disposed in a range (the 120° range) on the opposite side of the right line-of-sight sensor 106, with respect to the center of the right opening portion 145, may be more than a number of IREDs disposed in the rest of the range. In FIG. 1, the number of right IREDs disposed in the range (the 120° range) on the opposite side of the right line-of-sight sensor 106, with respect to the center of the right opening portion 145, is at least 3 more than the number of IREDs disposed in the rest of the range.

In the same manner, out of the 360° range around the center of the left opening portion 146 (optical axis of the left lens system 103), a number of light sources per degree (angle density) is the maximum in a range on the opposite side of the left line-of-sight sensor 107, with respect to the center of the left opening portion 146. In FIG. 1, in the 120° range (±60° range) of which center is at the 9:00 position facing the 3:00 position where the left line-of-sight sensor 107 is disposed, 9 left IREDs are disposed at a 15° pitch (angle density: 0.0667units/°). The 9 left IREDs are the left IREDs 126 to 134, which are disposed at the positions 11:00, 10:30, 10:00, 9:30, 9:00, 8:30, 8:00, 7:30 and 7:00. In the range other than this 120° range, the left IREDs are disposed at a pitch larger than the 15° pitch (smaller angle density than 0.0667)units/°.

A number of left IREDs disposed in a range (the 120° range) on the opposite side of the left line-of-sight sensor 107, with respect to the center of the left opening portion 146, may be more than a number of IREDs disposed in the rest of the range. In FIG. 1, the number of left IREDs disposed in the range (the 120° range) on the opposite side of the left line-of-sight sensor 107, with respect to the center of the left opening portion 146, is at least 3 more than the number of IREDs disposed in the rest of the range.

In Embodiment 1, a number of right IREDs disposed on the lower side of the right opening portion 145 is more than a number of right IREDs disposed on the upper side of the right opening portion 145. In FIG. 1, a right IRED is not disposed at the 12:00 position, and a number of right IREDs disposed on the lower side of the horizontal line 185 is more than a number of right IREDs disposed on the upper side of the horizontal line 185. On the lower side of the horizontal line 185, 7 right IREDs (right IRED 116, right IRED 117, right IRED 118, right IRED 119, right IRED 120, right IRED 121, and right IRED 122) are disposed. On the upper side of the horizontal line 185, 6 right IREDs (right IRED 108, right IRED 109, right IRED 111, right IRED 112, right IRED 113 and right IRED 114) are disposed.

In the same manner, a number of left IREDs disposed on the lower side of the left opening portion 146 is more than a number of left IREDs disposed on the upper side of the left opening portion 146. In FIG. 1, a left IRED is not disposed at the 12:00 position, and a number of left IREDs disposed on the lower side of the horizontal line 185 is more than a number of left IREDs disposed on the upper side of the horizontal line 185. On the lower side of the horizontal line 185, 7 left IREDs (left IRED 131, left IRED 132, left IRED 133, left IRED 134, left IRED 135, left IRED 136 and left IRED 137) are disposed. On the upper side of the horizontal line 185, 6 left IREDs (left IRED 123, left IRED 124, left IRED 126, left IRED 127, left IRED 128 and left IRED 129) are disposed.

The movements of human eyelids are different between an upper eyelid and a lower eyelid, and mainly the upper eyelid moves down toward the lower eyelid.

Individual differences of the position of the lower eyelid, with respect to the eyeball optical axis, are small, but individual differences of the position of the upper eyelid, with respect to the eyeball optical axis, are large. For example, compared with a person having large bright eyes, the position of the upper eyelid of a person having narrow eyes is lower and closer to the eyeball optical axis.

To perform the line-of-sight detection for many users, the line-of-sight needs to be detected even if the position of the upper eyelid is close to the eyeball optical axis. However, in the case where the position of the upper eyelid is close to the eyeball optical axis, the illuminated light from the IRED disposed at the 12:00 position is shaded by the eyelid, and is not captured as the Purkinje image (corneal reflex image) in the image. On the other hand, the individual differences of the positions of the lower eyelids are smaller, compared with the case of the positions of the upper eyelids, and the lower eyelids are more distant from the eyeball optical axis. Hence the illuminated light from the IRED disposed at the 6:00 position is less likely to be shaded by the eyelids, and tends to be captured as the Purkinje image (corneal reflex image) in the image more easily.

Therefore more IREDs are disposed on the lower side of the horizontal line 185 (lower side of the opening portion) than on the upper side of the horizontal line 185 (upper side of the opening portion), whereby line-of-sight detection can be performed for many users.

The line-of-sight detection unit for the right eye is constituted of the right line-of-sight sensor 106, the right IREDs 108, 109 and 111 to 122, and a control circuit (control unit) which is not illustrated. In the same manner, the line-of-sight detection unit for the left eye is constituted of the left line-of-sight sensor 107, the left IREDs 123, 124 and 126 to 137, and a control circuit (control unit) which is not illustrated. The control circuit of the line-of-sight detection unit for the right eye and the control unit of the line-of-sight detection unit for the left eye may be one common control circuit, or may be separate control circuits.

FIG. 3 indicates the disposition of the eyeball of the user looking into the display unit main body 101, and the display unit main body 101. FIG. 3 is a cross-sectional view sectioned at a plane passing through the center of the right line-of-sight sensor 106 and the center of the right lens system 102. In FIG. 3, the right eye and a peripheral area thereof are illustrated.

The right lens system 102 (display optical system) is held by a lens barrel 139. A right display panel 140 is a display panel (display unit) to display an image for the user, and is an organic EL panel, or the like. A cornea 142 exists inside an eyeball 141 (right eye) of the user. An image outputted from the right display panel 140 is inputted to the eyeball 141 through the right lens system 102. In other words, the user can view the image (picture) displayed on the right display panel 140 through the right lens system 102 (right opening portion 145) with the eyeball 141.

The optical axis of the right line-of-sight sensor 106 is not parallel with the optical axis of the right lens system 102 (display optical system), and is inclined in the direction to the eyeball 141 (diagonal direction). Thereby the limited angle of view of the right line-of-sight sensor 106 can be effectively used, and the right line-of-sight sensor 106 can continue capturing the eyeball 141 even if the eye point distance changes.

The configuration around the left eye is the same as the above mentioned configuration around the right eye.

In this way, according to Embodiment 1, the right line-of-sight sensor 106 is disposed on the periphery of the right opening portion 145 (right lens system 102), and a line-of-sight sensor lens optical axis 147a of the right line-of-sight sensor 106 is directed to the right eye. In the same manner, the left line-of-sight sensor 107 is disposed on the periphery of the left opening portion 146 (left lens system 103), and the line-of-sight sensor lens optical axis 147a of the left line-of-sight sensor 107 is directed to the left eye.

The illumination light emitted from the right IRED 115 illuminates the cornea 142 and the iris of the eyeball 141 (right eye). The right line-of-sight sensor 106 acquires the iris image of the eyeball 141 and also acquires the image of the light that transmits through an optical path 143 and an optical path 144 (a mirror reflection image when the illumination light of the right IRED 115 mirror-reflected on the cornea 142, that is, Purkinje image). The lights from the other IREDs disposed around the right lens system 102 also illuminate the iris and cornea, although this is not illustrated in FIG. 3. In the same manner, the cornea and the iris of the left eye are also illuminated by a plurality of left IREDs. Since the plurality of IREDs illuminate a single iris, non-uniformity of the illumination on the iris can be reduced.

Figure 4A:
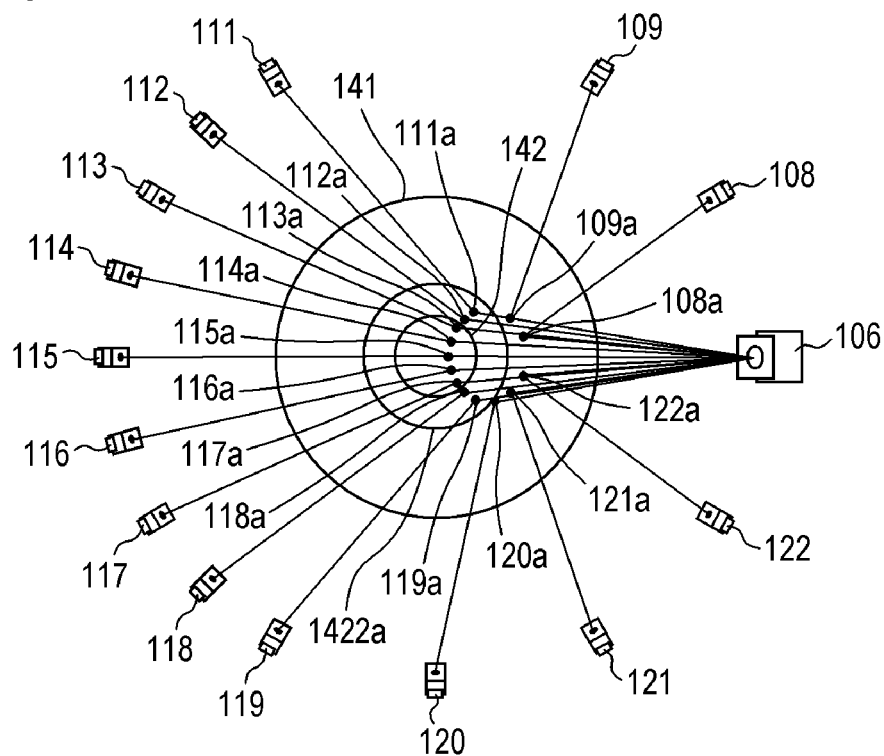
FIGS. 4A and 4B are schematic diagrams depicting reflection positions of an illumination light according to Embodiment 1.
Figure 4B:
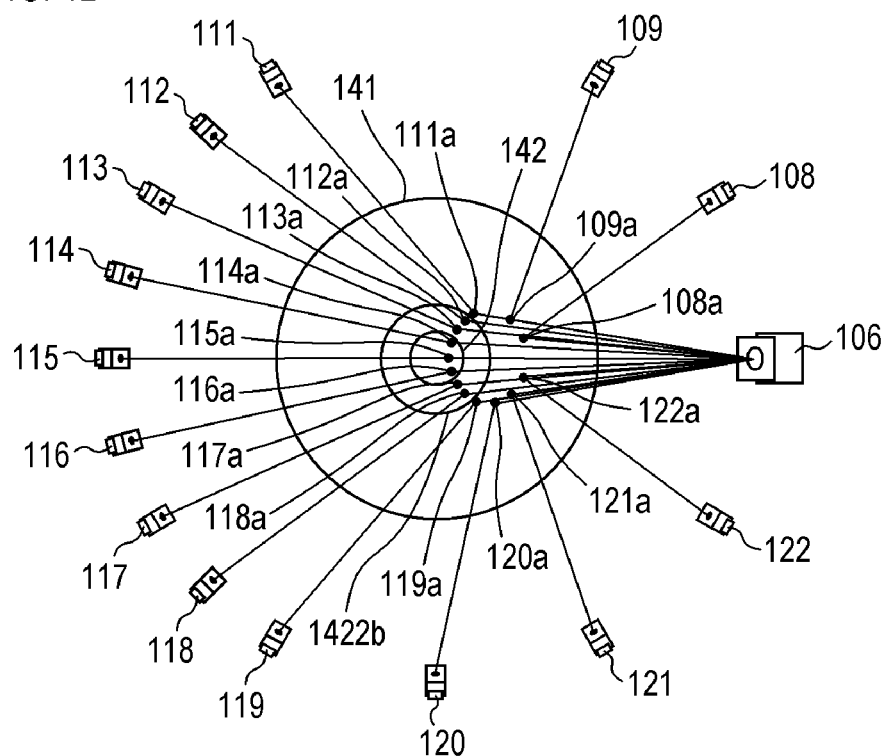

FIGS. 4A and 4B are schematic diagrams depicting a relationship between the reflection position of the infrared light (illumination light) emitted from each IRED and the cornea. FIGS. 4A and 4B indicate a state of the eyeball 141 (right eye) of the user wearing the display unit main body 101, viewed from the side of the display unit main body 101. Here a case of the right eye will be described, but a case of the left eye is the same as the case of the right eye.

The infrared lights emitted from the right IREDs 108, 109 and 111 to 122 disposed around the right lens system 102 reflect at reflection positions 108a, 109a and 111a to 122a, and enter the right line-of-sight sensor 106. The reflection positions 108a, 109a and 111a to 122a correspond to the right IREDs 108, 109 and 111 to 122 respectively.

A corneal boundary 1422a in FIG. 4A and a corneal boundary 1422b in FIG. 4B indicate boundaries between the cornea 142 and a sclera. The inner side of the corneal boundary 1422a (corneal boundary 1422b) is a spherical surface. The portion of the corneal boundary 1422a (corneal boundary 1422b) is a gentle curved surface from the spherical surface (cornea) to the whites of the eye (sclera). An area of the cornea is different depending on the person and the corneal boundary 1422a in FIG. 4A indicates a corneal boundary of a user having a large corneal area, and the corneal boundary 1422b in FIG. 4B indicates a corneal boundary of a user having a small corneal area.

FIGS. 4A and 4B indicate a state where the eyeball 141 is facing the front. As illustrated in FIG. 4A, the lights emitted from the right IREDs 111 to 119, which are disposed in a 120° range with the position facing the right line-of-sight sensor 106 as the center, are mirror-reflected on the inner side of the corneal boundary 1422a of the cornea of the user with a large area of the cornea. As illustrated in FIG. 4B, the lights emitted from the right IREDs 112 to 118, which are disposed in a 90° range with the position facing the right line-of-sight sensor 106 as the center, are mirror-reflected on the inner side of the corneal boundary 1422b of the cornea of the user with a small area of the cornea. Reflection positions 112a to 118a are located near the eyeball optical axis, hence the lights emitted from the right IREDs 112 to 118 are highly likely to be mirror-reflected on the cornea even if the eyeball rotates.

The reflection positions 108a, 109a and 120a to 122a of the infrared lights emitted from the right IREDs 108, 109 and 120 to 122 are sclera portions. Therefore in the state where the user is facing the front as illustrated in FIGS. 4A and 4B, the mirror reflection images (Purkinje images) of the right IREDs 108, 109 and 120 to 122 are not acquired. The right IREDs 108, 109 and 120 to 122 are disposed to illuminate the entire eyeball 141, or to acquire the Purkinje image when the eyeball 141 rotates.

By disposing many right IREDs in the portion facing the right line-of-sight sensor 106, the mirror reflection image (Purkinje image) to detect the line-of-sight is more likely to be acquired, and the success rate of the line-of-sight detection can be increased.

In Embodiment 1, many IREDs are disposed in the 120° range for a person of which area of cornea is large, but many IREDs may be disposed in the 90° range for a person of which area of cornea is small. By narrowing the range where many IREDs are disposed, cost can be reduced.

When an image of the eyeball 141 (right eye) is acquired by the right line-of-sight sensor 106, the line-of-sight detection is performed using a combination of a pupil image inside the iris image and the Purkinje image. For example, the line-of-sight detection is performed using the method disclosed in Japanese Patent No. 3186072.

As described above, according to Embodiment 1, a number of light sources per degree is the maximum in a range on the opposite side of the line-of-sight sensor, with respect to the center of the opening portion (optical axis of the display optical system) facing the eye of the user. Thereby a head mounted display (line-of-sight detection device), which can detect a line-of-sight at high precision regardless the situation, can be provided. For example, a head mounted display, which can detect the line-of-sight even in a case where the user shifted their eyes, can be provided without increasing the size of the device.

Embodiment 2

Embodiment 2 of the present invention will now be described with reference to FIGS. 6 and 7. In Embodiment 2, an example of a spectacle type device equipped with a line-of-sight detection device will be described.

Figure 6:
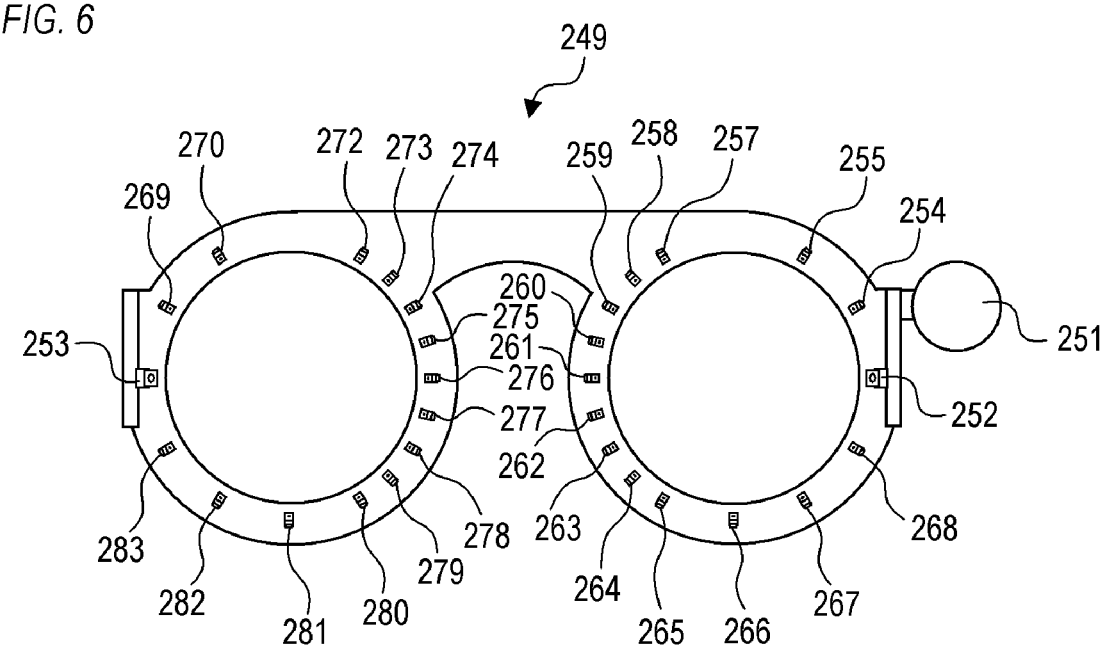
FIG. 6 is a rear view of a spectacle type device according to Embodiment 2.
Figure 7:
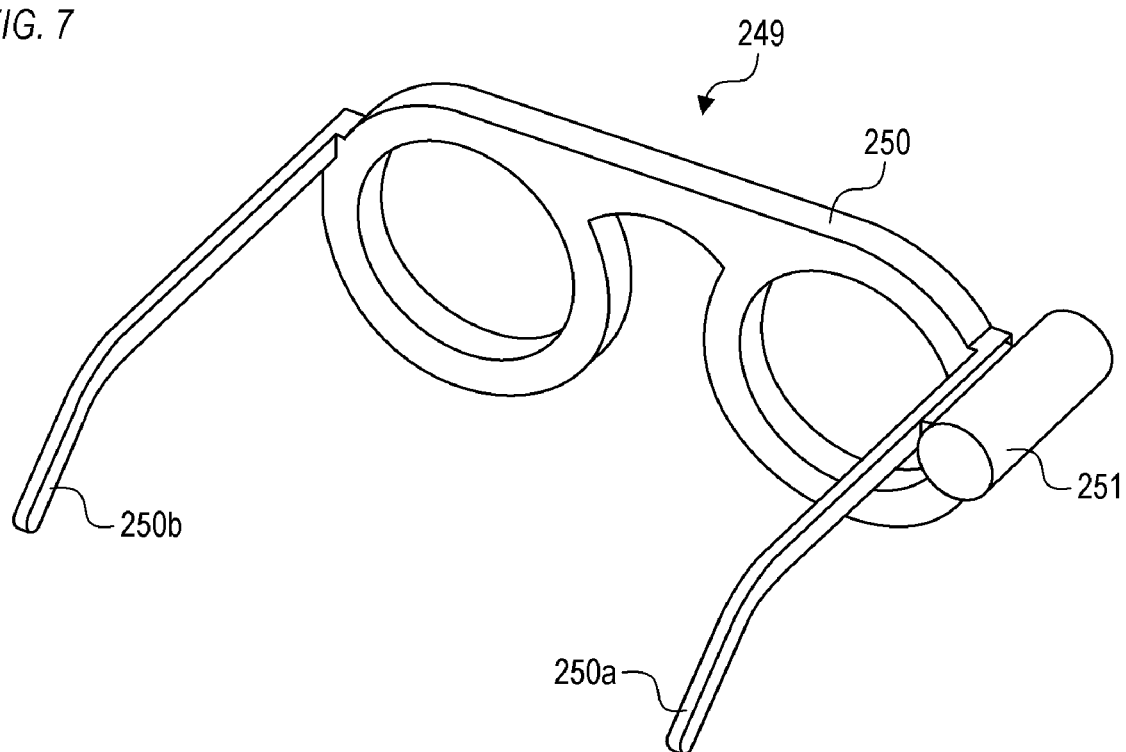
FIG. 7 is a perspective view of the spectacle type device according to Embodiment 2.

FIG. 6 is a rear view of a spectacle type device 249 according to Embodiment 2, and FIG. 7 is a perspective view of the spectacle type device 249. FIG. 6 indicates a state viewing the spectacle type device 249 from an eyeball side of a user (user wearing the spectacle type device 249).

The spectacle type device 249 includes a frame 250, a right temple portion 250a and a left temple portion 250b. To the frame 250, arbitrary lenses, such as lenses for near sightedness, lenses for far sightedness, light reduction lenses and plain glass lenses, may be fitted, or no lenses may be fitted. The right temple portion 250a and the left temple portion 250b are securing portions to secure the spectacle type device 249 to the head of the user. By hooking the right temple portion 250a to the right ear and hooking the left temple portion 250b to the left ear, the user secures the spectacle type device 249 to the head. A camera 251 is attached to the right temple portion 250a, and the camera 251 is directed to the front direction of the spectacle type device 249.

In the frame 250, a right line-of-sight sensor 252, a left line-of-sight sensor 253, right IREDs 254, 255 and 257 to 268, and left IREDs 269, 270 and 272 to 283 are disposed. The camera 251, the right line-of-sight sensor 252, the left line-of-sight sensor 253, the right IREDs 254, 255 and 257 to 268, and the left IREDs 269, 270 and 272 to 283 are connected to a control circuit (not illustrated). The spectacle type device 249 includes a function to detect a part of the imaging range of the camera 251 to which the lines-of-sight are directed.

As illustrated in FIG. 6, in Embodiment 2, a number of light sources per degree is the maximum in a range on the opposite side of the line-of-sight sensor, with respect to the center of the opening facing the eye of the user, just like Embodiment 1.

As described above, according to Embodiment 2, a number of light sources per degree is the maximum in a range on the opposite side of the line-of-sight sensor, with respect to the center of the opening portion (optical axis of the display optical system) facing the eye of the user, just like Embodiment 1. Thereby a spectacle type device (line-of-sight detection device) which can detect a line-of-sight at high precision, regardless the situation, can be provided.

Embodiment 3

Embodiment 3 of the present invention will now be described with reference to FIGS. 8 to 12. In Embodiment 3, an example of a head mounted display equipped with a line-of-sight detection device will be described.

Figure 8:
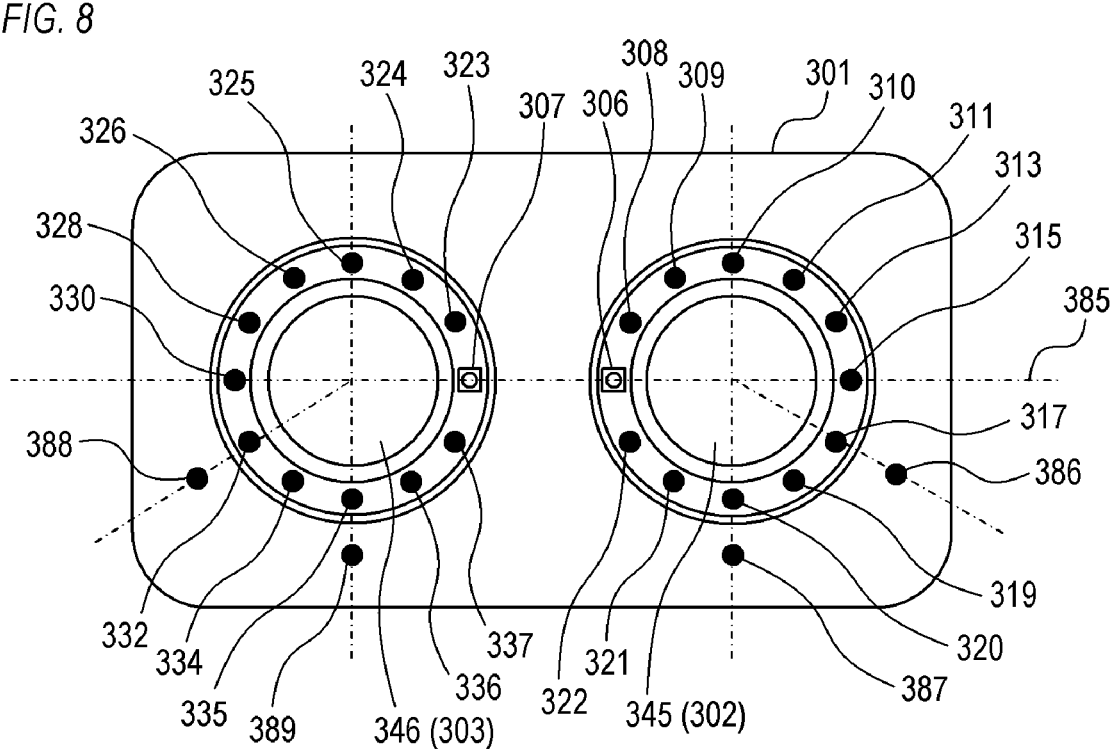
FIG. 8 is a rear view of a display unit main body according to Embodiment 3.

FIG. 8 is a rear view of a display unit main body 301 of the head mounted display according to Embodiment 3, and indicates a state viewing the display unit main body 301 from an eyeball side of the user (user wearing the head mounted display).

The display unit main body 301 includes a right opening portion 345 which limits a field-of-view of a right eye of the user, and a left opening portion 346 which limits a field-of-view of a left eye of the user. On the right opening portion 345 (inside the right opening portion), a right lens system 302, which is a display optical system, is disposed, and on the left opening portion 346 (inside the left opening portion), a left lens system 303, which is a display optical system, is disposed. The right opening portion 345 and the right lens system 302 are disposed to face the right eye of the user (user wearing the head mounted display). The left opening portion 346 and the left lens system 303 are disposed to face the left eye of the user (user wearing the head mounted display).

As illustrated in FIG. 8, a right line-of-sight sensor 306 is disposed on an edge of the right opening portion 345 (right lens system 302), so as to be directed to the right eye facing the right opening portion 345. In the same manner, a left line-of-sight sensor 307 is disposed on an edge of the left opening portion 346 (left lens system 303), so as to be directed to the left eye facing the left opening portion 346.

The right line-of-sight sensor 306 is disposed at the 9:00 position (position at 270° rotated clockwise from the position directly above), with the center of the right opening portion 345 (optical axis of the right lens system 302) as the center. The left line-of-sight sensor 307 is disposed at the 3:00 position (position at 90° rotated clockwise from the position directly above), with the center of the left opening portion 346 (optical axis of the left lens system 303) as the center. The right line-of-sight sensor 306 and the left line-of-sight sensor 307 are disposed approximately at the same height (vertical position).

The right line-of-sight sensor 306 is disposed on the left side of the right opening portion 345 (near the right eye), and the left line-of-sight sensor 307 is disposed on the right side of the left opening portion 346 (near the left eye).

In this way, the right line-of-sight sensor 306 and the left line-of-sight sensor 307 are disposed on a horizontal line 385 passing through the optical axis of the right lens system 302 and the optical axis of the left lens system 303 (on a horizontal line passing through the center of the right opening portion 345 and the center of the left opening portion 346).

Normally eyelids of a user (user wearing the head mounted display) open vertically. Therefore the right line-of-sight sensor 306 and the left line-of-sight sensor 307 are disposed such that the eyeballs are observed in the direction of the horizontal line 385, whereby the eyeballs are not shaded very much by the eyelids when the line-of-sight is detected, and the success rate of the line-of-sight detection can be improved.

In FIG. 8, a plurality of infrared light-emitting diodes (right IREDs) are disposed along the edge of the right opening portion 345 (right lens system 302) as a plurality of light sources to illuminate the eyeball (right eye). In the same manner, a plurality of infrared light-emitting diodes (left IREDs) are disposed along the edge of the left opening portion 346 (left lens system 303) as a plurality of light sources to illuminate the eyeball (left eye).

Around the right opening portion 345 (right lens system 302), right IREDs 308 to 311, 313, 315, 317 and 319 to 322 are disposed as a first light source group, and right IREDs 386 and 387 are disposed as a second light source group. With the center of the right opening portion 345 (optical axis of the right lens system 302) as the center, the right IRED 308 is disposed at the 10:00 position, the right IRED 309 at the 11:00 position, the right IRED 310 at the 12:00 position, the right IRED 311 at the 1:00 position, the right IRED 313 at the 2:00 position, and the right IRED 315 at the 3:00 position. Further, the right IRED 317 is disposed at the 4:00 position, the right IRED 319 at the 5:00 position, the right IRED 320 at the 6:00 position, the right IRED 321 at the 7:00 position, and the right IRED 322 at the 8:00 position. The right IRED 386 is disposed on a line passing through the center of the right opening portion 345 (optical axis of the right lens system 302) and the right IRED 317. The right IRED 387 is disposed on a line passing through the center of the right opening portion 345 (optical axis of the right lens system 302) and the right IRED 320.

Around the left opening portion 346 (left lens system 303), left IREDs 323 to 326, 328, 330, 332 and 334 to 337 are disposed as a first light source group, and left IREDs 388 and 389 are disposed as a second light source group. With the center of the left opening portion 346 (optical axis of the left lens system 303) as the center, the left IRED 323 is disposed at the 2:00 position, the left IRED 324 at the 1:00 position, the left IRED 325 at the 12:00 position, the left IRED 326 at the 11:00 position, the left IRED 328 at the 10:00 position, and the left IRED 330 at the 9:00 position. Further, the left IRED 332 is disposed at the 8:00 position, the left IRED 334 at the 7:00 position, the left IRED 335 at the 6:00 position, the left IRED 336 at the 5:00 position, and the left IRED 337 at the 4:00 position. The left IRED 388 is disposed on a line passing through the center of the left opening portion 346 (optical axis of the left lens system 303) and the left IRED 332. The left IRED 389 is disposed on a line passing through the center of the left opening portion 346 (optical axis of the left lens system 303) and the left IRED 335.

A distance from each of the right IREDs 386 and 387 included in the second light source group to the right opening portion 345 is longer than a distance from each of the right IREDs 308 to 311, 313, 315, 317 and 319 to 322 included in the first light source group to the right opening portion 345. Further, with respect to the right opening portion 345, the right IREDs 308 to 311, 313, 315, 317 and 319 to 322 included in the first light source group are disposed on the inner side of the right IREDs 386 and 387 included in the second light source group. In the same manner, a distance from each of the left IREDs 388 and 389 included in the second light source group to the left opening portion 346 is longer than a distance from each of the left IREDs 323 to 326, 328, 330, 332 and 334 to 337 included in the first light source group to the left opening portion 346. Further, with respect to the left opening portion 346, the left IREDs 323 to 326, 328, 330, 332 and 334 to 337 included in the first light source group are disposed on the inner side of the left IREDs 388 and 389 included in the second light source group.

For example, a plurality of IREDs (a plurality of first light sources) included in the first light source group are distributed at a first distance r1 from the optical axis of the display optical system, and a plurality of IREDs (a plurality of second light sources) included in the second light source group are distributed at a second distance r2 from the optical axis of the display optical system. Here the second distance r2 is longer than the first distance r1. The distance from each of the plurality of IREDs included in the first light source group to the optical axis of the display optical system need not be fixed, and the distance from each of the plurality of IREDs included in the second light source group to the optical axis of the display optical system need not be fixed either. For example, the distance from each of the plurality of IREDs included in the first light source group to the optical axis of the display optical system may be dispersed in the range of at least a distance r1a and not more than a distance r1b. The distance from each of the plurality of IREDs included in the second light source group to the optical axis of the display optical system may be dispersed in a range of at least a distance r2a and not more than a distance r2b. The distances r1, r1a, r1b, r2, r2a and r2b satisfy the following expression.

$$r1a < r1 \leq r1b < r2a \leq r2 < r2b$$

The display unit main body 301 includes a CPU (control unit) to control each IRED, through this is not illustrated. The CPU supplies current to each IRED, so as to control the lighting of each IRED. The CPU also detects the line-of-sight of the user based on the output (e.g. Purkinje image) of the line-of-sight sensor.

Figure 9:
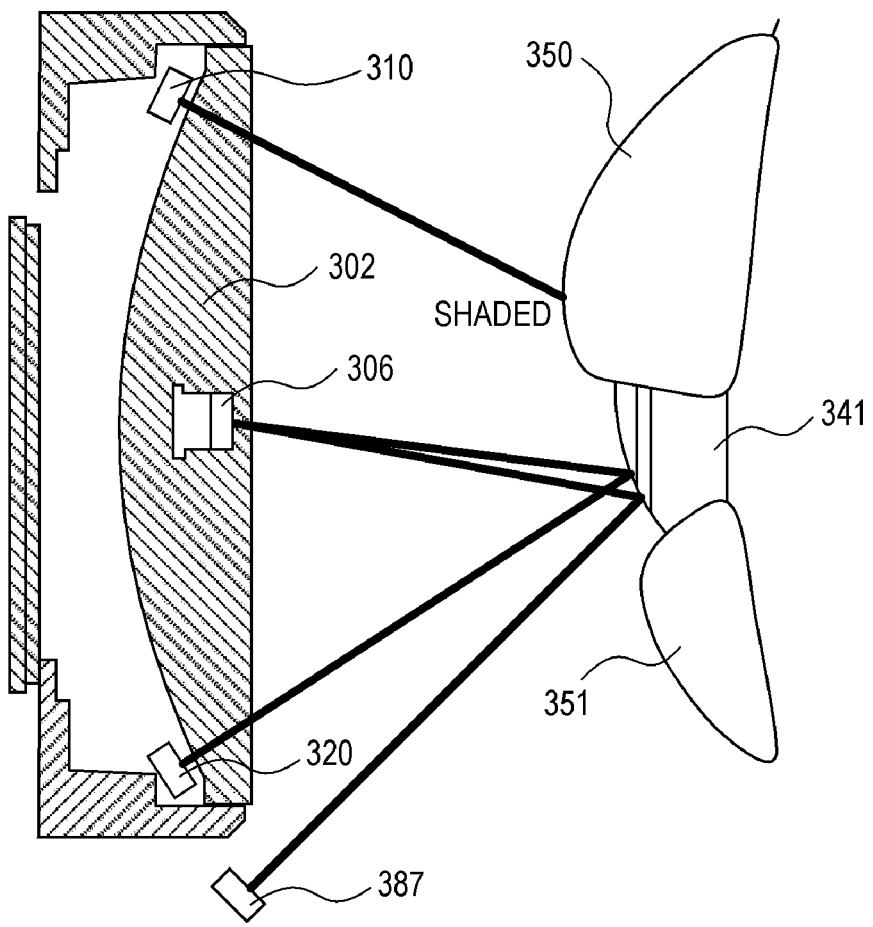
FIG. 9 is a cross-sectional view of the display unit main body according to Embodiment 3.

FIG. 9 is a schematic diagram depicting a longitudinal cross-section passing through the optical axis of the right lens system 302 in FIG. 8. FIG. 9 indicates a right eye and a peripheral area thereof. In FIG. 9, optical paths of lights emitted from the right IREDs 310, 320 and 387 are indicated. The right line-of-sight sensor 306 does not exist on the longitudinal cross-section, but is included here to assist understanding.

In FIG. 9, the light from the right IRED 310 disposed on the upper side of the right lens system 302 is shaded by the upper eyelid 350 of the user, and is not mirror-reflected on the surface of the cornea. Therefore the light from the right IRED 310 is not captured as the mirror reflection image (Purkinje image) in the image acquired by the right line-of-sight sensor 306. On the other hand, the light from the right IRED 320 disposed on the lower side of the right lens system 302 is not shaded by the upper eyelid 350 and the lower eyelid 351, and is mirror-reflected on the surface of the cornea. Therefore the light from the right IRED 320 is captured as the mirror reflection image (Purkinje image) in the image acquired by the right line-of-sight sensor 306. In the same manner, the light from the right IRED 387 disposed on the lower side of the right lens system 302 is not shaded by the upper eyelid 350 and the lower eyelid 351, and is mirror-reflected on the surface of the cornea. Therefore the light from the right IRED 387 is captured as the mirror reflection image (Purkinje image) in the image acquired by the right line-of-sight sensor 306.

The shape of the eyelid is different depending on the person, and the positional relationship between the display unit main body 301 and the eye is also different depending on the person, but the light is shaded in a similar way. Here a case where the right line-of-sight sensor 306 and the left line-of-sight sensor 307 are disposed on the horizontal line 385 passing through the optical axis of the right lens system 302 and the optical axis of the left lens system 303 is considered. In this case, the light from an IRED disposed on the lower side of the horizontal line 385 is less likely to be shaded by the eyelid than the light from an IRED disposed on the upper side of the horizontal line 385.

Therefore in FIG. 8, more IREDs of the second light source group are disposed on the lower side of the horizontal line 385 (on the lower side of the right opening portion 345 and the left opening portion 346) than those on the upper side of the horizontal line 385 (on the upper side of the right opening portion 345 and the left opening portion 346). Thereby it can be avoided that lights from all the IREDs are shaded by the eyelids, and no mirror reflection images (Purkinje images) can be acquired, and the success rate of the line-of-sight detection can be improved (robustness of the line-of-sight detection can be improved). In FIG. 8, no IREDs of the second light source group are disposed on the upper side of the horizontal line 385 (on the upper side of the right opening portion 345 or the left opening portion 346), but IREDs of the second light source group may be disposed on the upper side of the horizontal line 385.

In FIG. 9, the right IREDs 310 and 320 belonging to the first light source group are disposed on the inner side of the right lens system 302, and the right IRED 387 belonging to the second light source group is disposed on the outer side of the right lens system 302. Therefore the right IREDs 310 and 320 emit light to the outside through the right lens system 302, and illuminate the eyeball 341 (right eye). The right IRED 387 emits light to the outside without passing through the right lens system 302, and illuminates the eyeball 341. This configuration is not limited to the right IREDs 310, 320 and 387, but the right IREDs belonging to the first light source group emit light to the outside through the right lens system 302, and the right IREDs belonging to the second light source group emit light to the outside without passing through the right lens system 302. In the same manner, the left IREDs belonging to the first light source group emit light to the outside through the left lens system 303, and the left IREDs belonging to the second light source group emit light to the outside without passing through the left lens system 303.

Thereby in a case where both the first light source group and the second light source group cannot be disposed on the inner side of the display optical system (the right lens system 302 and the left lens system 303) due to space restrictions, the size of the device can be decreased compared with the case of disposing both the first light source group and the second light source group on the outer side of the display optical system.

In terms of aesthetics, it is preferable that each IRED belonging to the second light source group is concealed using a material which does not transmit visible light and transmits infrared light. However, just like Embodiment 1, the transmittance of the visible light is not limited to 0, and some transmission of visible light may be allowed. The similar effect can be acquired if the transmittance of the infrared light is higher than the transmittance of the visible light, but it is preferable that the transmittances (shield factors) are considerably different between the visible light and the infrared light.

Here when the light from the first light source group passes through the display optical system, the light quantity of the light decreases. In particular, when the display optical system includes a polarizing reflection optical system, the light quantity of the light from the first light source group may be decreased by half or less. Therefore if all the IREDs are lit at a same brightness, illuminance to illuminate the eyeball changes between each IRED of the first light source group that illuminates the eyeball through the display optical system, and each IRED of the second light source group that illuminates the eyeball without passing through the display optical system. As a result, the brightness of the mirror reflection image (Purkinje image) becomes different between the first light source group and the second light source group. This difference of the brightness has a negative influence (e.g. a drop in precision) to detect the Purkinje image, and therefore has a negative influence (e.g. a drop in precision) on the line-of-sight detection.

Therefore in Embodiment 3, the CPU lights each IRED of the first light source group and each IRED of the second light source group at different brightness values. For example, the CPU increases the brightness of each IRED of the first light source group, which illuminates the eyeball through the display optical system, by the amount of light quantity absorbed by the display optical system, and lights each IRED of the first light source group at a brightness value higher than each IRED of the second light source group, which illuminates the eyeball without passing through the display optical system.

Thereby the brightness of the Purkinje image of the first light source group and the brightness of the Purkinje image of the second light source group become similar, hence precision of detecting the Purkinje image improves, and thereby precision of the line-of-sight detection improves.

Figure 10A:
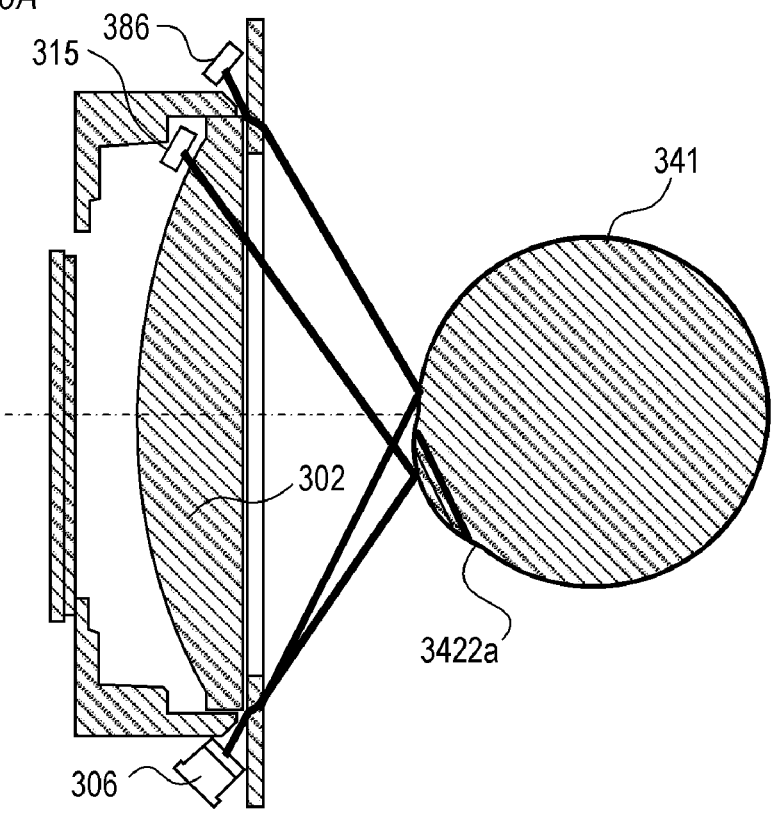
FIGS. 10A and 10B are cross-sectional views of the display unit main body according to Embodiment 3.
Figure 10B:
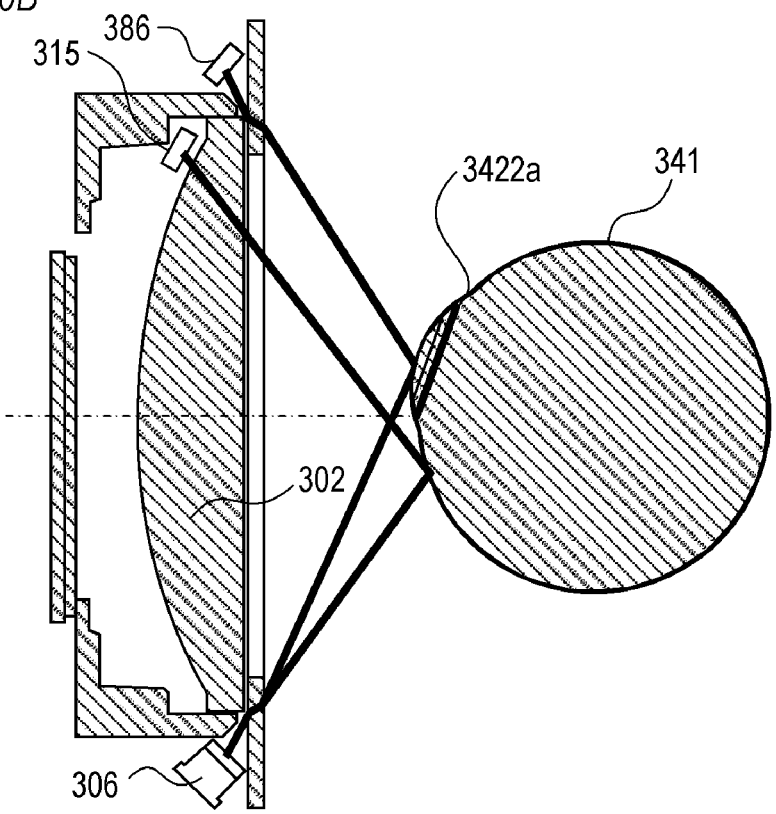

FIGS. 10A and 10B are schematic diagrams depicting lateral cross-sections passing through the right IRED 315 and the right line-of-sight sensor 306. In FIGS. 10A and 10B, optical paths of lights emitted from the right IREDs 315 and 386 are indicated. The right IRED 386 does not exist on the lateral cross-section, but is included here to assist understanding.

FIG. 10A indicates a state where an eyeball 341 (right eye) is rotated in a direction where the right line-of-sight sensor 306 is disposed (that is, to the left side). FIG. 10B indicates a state where the eyeball 341 is rotated in a direction opposing the right line-of-sight sensor 306 (that is, to the right side).

As illustrated in FIG. 10A, in the case where the eyeball 341 is rotated in the direction where the right line-of-sight sensor 306 is disposed, the light emitted from the right IRED 386 is reflected on the outer side (sclera) of a corneal boundary 3422*a*. On the other hand, the light emitted from the right IRED 315 is mirror-reflected on the inner side (cornea) of the corneal boundary 3422*a*.

As illustrated in FIG. 10B, in the case where the eyeball 341 is rotated in the direction opposing the right line-of-sight sensor 306, the light emitted from the right IRED 315 is reflected on the outer side (sclera) of the corneal boundary 3422*a*. On the other hand, the light emitted from the right IRED 386 is mirror-reflected on the inner side (cornea) of the corneal boundary 3422*a*.

In this way, by disposing the IREDs (first light source group) of which distance from the optical axis of the display optical system is short and the IREDs (second light source group) of which distance from the optical axis of the display optical system is long, the mirror reflection image (Purkinje image) can be acquired at high probability even if the eye of the user shifted. Further, the success rate of the line-of-sight detection can be improved (robustness of the line-of-sight detection can be improved).

In the case where the eyeball 341 is rotated in the direction where the right line-of-sight sensor 306 is disposed, as illustrated in FIG. 10A, the line-of-sight can be detected using the mirror reflection image of the right IRED 315 (first light source group) of which distance from the right opening portion 345 is short.

In the case where the eyeball 341 is rotated in the direction opposing the right line-of-sight sensor 306, as illustrated in FIG. 10B, the line-of-sight can be detected using the mirror reflection image of the right IRED 386 (second light source group) of which distance from the right opening portion 345 is long.

Figure 11:
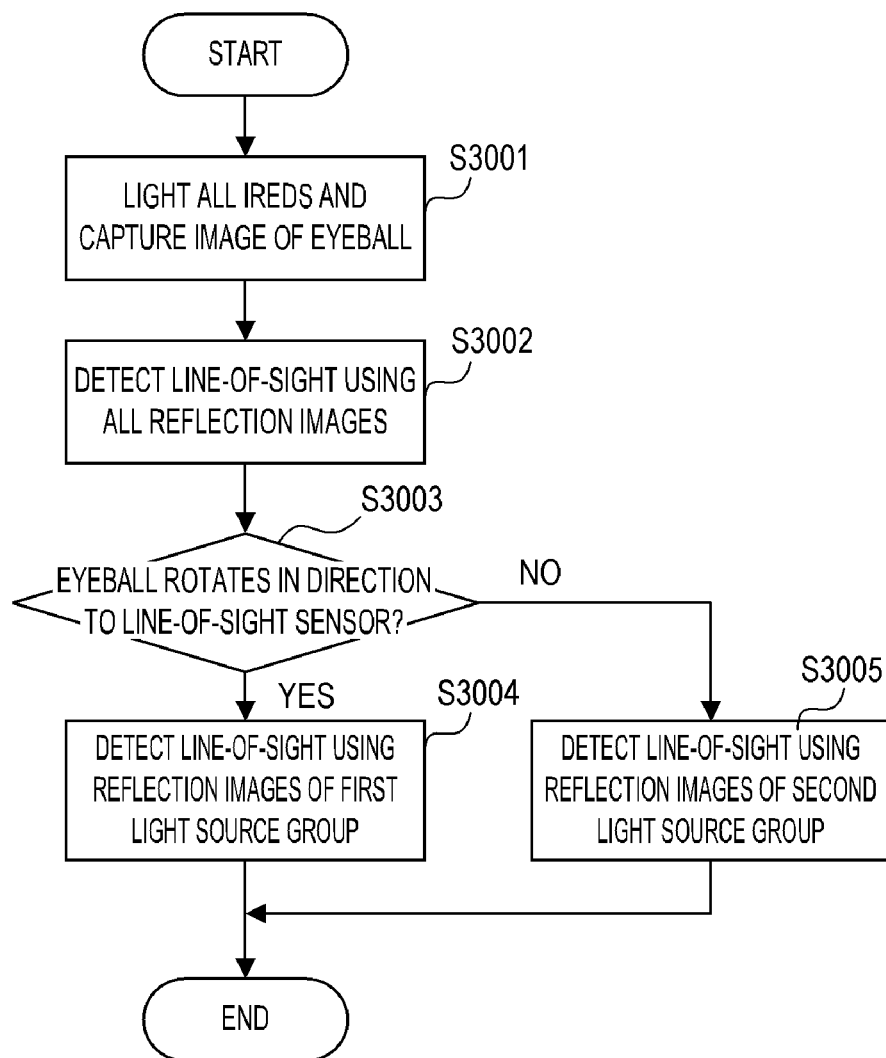
FIG. 11 is a flow chart of the line-of-sight detection according to Embodiment 3.

FIG. 11 is a flow chart of the line-of-sight detection. In the following, a case of the line-of-sight detection for the right eye will be described, but the line-of-sight detection for the left eye is also performed in the same manner.

In step S3001, the CPU lights all the right IREDs (the first light source group and the second light source group), and captures an image of the eyeball 341 (right eye) using the right line-of-sight sensor 306. Here all of the plurality of right IREDs are lit, but only a part of the plurality of right IREDs may be lit.

In step S3002, the CPU performs first line-of-sight detection (tentative detection of line-of-sight) using all of the reflection images captured in the image of the eyeball 341 acquired in step S3001. The reflection image captured in the image of the eyeball 341 can be regarded as the reflection image formed on the right line-of-sight sensor 306. Here the reflection image reflected by the sclera (inaccurate Purkinje image) is also used, so the line-of-sight cannot be detected at high precision, but a general rotating direction and rotation angle of the eyeball 341 can be known.

In step S3003, the CPU determines whether the eyeball 341 rotated in the direction where the right line-of-sight sensor 306 is disposed or rotated in the direction opposing the right line-of-sight sensor 306. If it is determined that the eyeball 341 rotated in the direction where the right line-of-sight sensor 306 is disposed, the CPU advances processing to step S3004, and if it is determined that the eyeball 341 rotated in the direction opposing the right line-of-sight sensor 306, the CPU advances processing to step S3005.

In step S3004, the CPU selects reflection images (mirror reflection images) of the first light source group of which distance from the right opening portion 345 is short, and performs the second line-of-sight detection (final detection of line-of-sight) using the selected reflection images.

In step S3005, the CPU selects reflection images (mirror reflection images) of the second light source group of which distance from the right opening portion 345 is long, and performs the second line-of-sight detection (final detection of line-of-sight) using the selected reflection images.

In this way, the reflection images to be used for the line-of-sight detection are changed based on the rotation angle of the eyeball 341. Thereby compared with the configuration to perform the line-of-sight detection always using all the reflection images, the line-of-sight detection can be performed without using the inaccurate Purkinje images reflected on the sclera, hence the precision of the line-of-sight detection is improved.

In the example described above, only one of the reflection images of the first light source group and the reflection images of the second light source group is finally used, but the present invention is not limited to this. For example, only one of the reflection images of the first light source group and the reflection images of the second light source group are used in a certain portion, and only the other reflection images of the first light source group and the reflection images of the second light source group are used in another portion. In a scene where both the reflection image of the first light source group and the reflection image of the second light source group become mirror reflection images, the result of the line-of-sight detection using both the reflection image of the first light source group and the reflection image of the second light source group (all reflection images) may be regarded as the final result.

Figure 12:
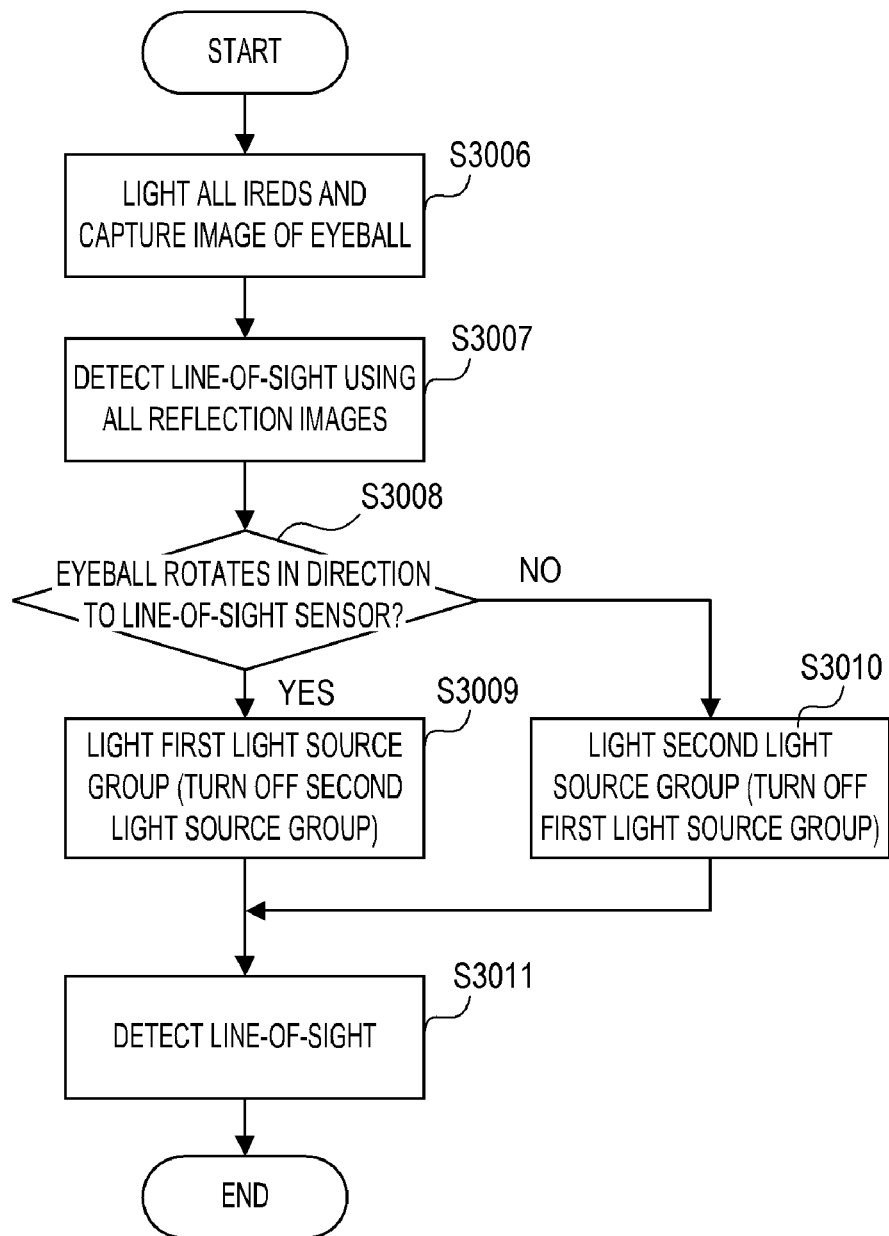
FIG. 12 is a flow chart of a modification of the line-of-sight detection according to Embodiment 3.

FIG. 12 is a modification of the flow chart of the line-of-sight detection. In the following, a case of the line-of-sight detection for the right eye will be described, but the line-of-sight detection for the left eye is also performed in the same manner.

In step S3006, the CPU lights all the right IREDs (the first light source group and the second light source group), and captures an image of the eyeball 341 (right eye) using the right line-of-sight sensor 306.

In step S3007, the CPU performs the first line-of-sight detection (tentative detection of line-of-sight) using all the reflection images captured in the image of the eyeball 341 acquired in step S3001. Here the reflection image reflected by the sclera (inaccurate Purkinje image) is also used, so the line-of-sight cannot be detected at high precision, but a general rotating direction and rotation angle of the eyeball 341 can be known.

In step S3008, the CPU determines whether the eyeball 341 rotated in the direction where the right line-of-sight sensor 306 is disposed or rotated in the direction opposing the right line-of-sight sensor 306. If it is determined that the eyeball 341 rotated in the direction where the right line-of-sight sensor 306 is disposed, the CPU advances processing to step S3009, and if it is determined that the eyeball 341 rotated in the direction opposing the right line-of-sight sensor 306, the CPU advances processing to step S3010.

In step S3009, the CPU turns off the second light source group of which distance from the right opening portion 345 is long, and lights only the first light source group of which distance from the right opening portion 345 is short.

In step S3010, the CPU turns off the first light source group of which distance from the right opening portion 345 is short, and lights only the second light source group of which distance from the right opening portion 345 is long.

In step S3011, the CPU performs the second line-of-sight detection (final detection of line-of-sight) using the image of the eyeball 341 acquired in a state where a part of the plurality of right IREDs is turned off.

In this way, the right IREDs used for the line-of-sight detection (right IRED to be lit) are changed based on the rotation angle of the eyeball 341. Since the right IREDs that are not used for the line-of-sight detection can be turned off, power can be conserved.

In the example described above, only one of the first light source group and the second light source group is finally lit, but the present invention is not limited to this. For example, only one of the IREDs of the first light source group and the IREDs of the second light source group is lit in a certain portion, and only the other IREDs of the first light source group and the IREDs of the second light source group is lit in another portion. In a scene where both the reflection images of the first light source group and the reflection images of the second light source group become mirror reflection images, the result of the line-of-sight detection acquired by lighting both the first light source group and the second light source group (all IREDs) may be regarded as the final result.

As described above, according to Embodiment 3, the IREDs (first light source group) of which distance from the optical axis of the display optical system is short and the IREDs (second light source group) of which distance from the optical axis of the display optical system is long are disposed. Therefore a head mounted display (line-of-sight detection device), which can detect the line-of-sight at high precision regardless the situation, can be provided. For example, the mirror reflection image (Purkinje image) can be acquired at high probability even if the eye of the user shifted. Further, the success rate of the line-of-sight detection can be improved (robustness of the line-of-sight detection can be improved).

Embodiment 3 may be combined with Embodiment 1. For example, in the case of focusing on at least one of the first light source group and the second light source group, a number of light sources per degree may be set to the maximum in a range on the opposite side of the line-of-sight sensor, with respect to the center of the opening portion (optical axis of the display optical system) facing the eye of the user. Thereby the success rate of the line-of-sight detection can be further improved.

Embodiment 4

Embodiment 4 of the present invention will now be described with reference to FIGS. 13 to 15. In Embodiment 4, an example of a head mounted display equipped with a line-of-sight detection device will be described.

Figure 13:
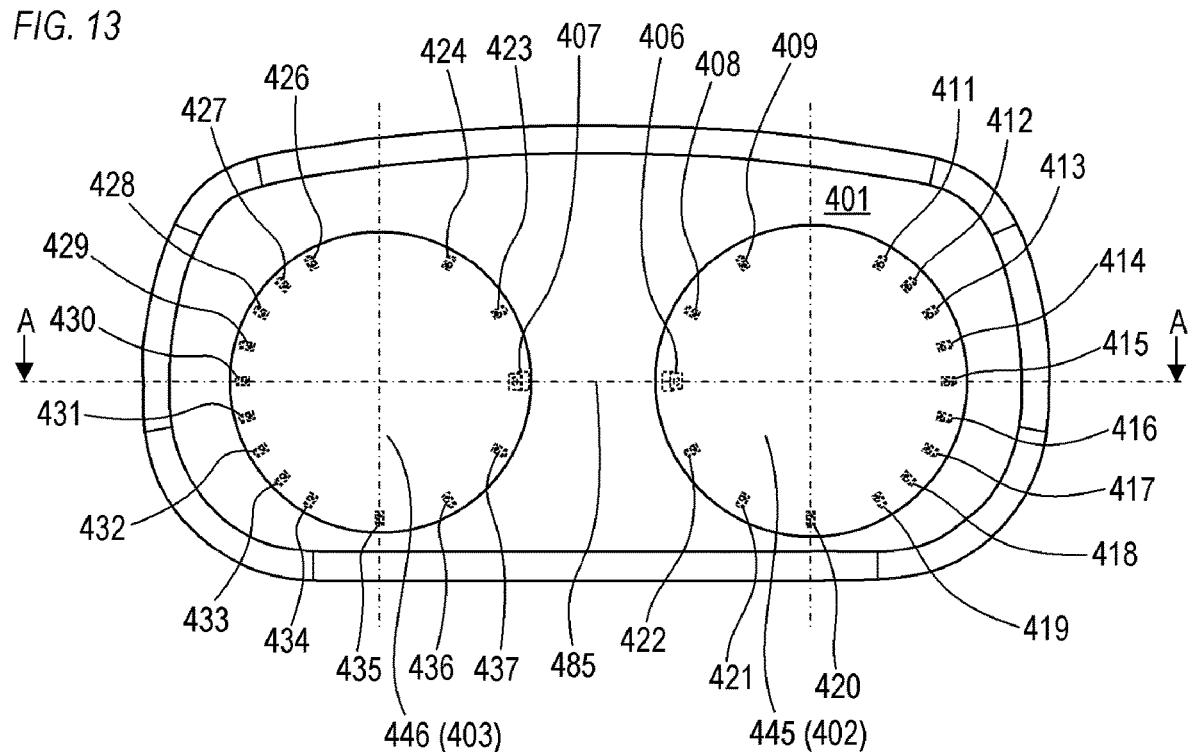
FIG. 13 is a rear view of a display unit main body according to Embodiment 4.

FIG. 13 is a rear view of a display unit main body 401 of the head mounted display according to Embodiment 4. FIG. 14 is a cross-sectional view sectioned at A-A in FIG. 13. FIG. 13 indicates a state of viewing the display unit main body 101 from the eyeball side of the user (user wearing the head mounted display).

The display unit main body 401 includes a right opening portion 445 which limits a field-of-view of a right eye of the user, and a left opening portion 446 which limits a field-of-view of a left eye of the user. On the right opening portion 445 (inside the right opening portion), a right lens system 402, which is a display optical system, is disposed, and on the left opening portion 446 (inside the left opening portion), a left lens system 403, which is a display optical system, is disposed. The right opening portion 445 and the right lens system 402 are disposed to face the right eye of the user (user wearing the head mounted display). The left opening portion 446 and the left lens system 403 are disposed to face the left eye of the user (user wearing the head mounted display).

As illustrated in FIG. 13, a right line-of-sight sensor 406 is disposed on an edge of the right opening portion 445 (right lens system 402), so as to be directed to the right eye facing the right opening portion 445. The right line-of-sight sensor 406 is disposed on the rear side of the right lens system 402, and light enters the right line-of-sight sensor 406 from the outside through the right lens system 402. In the same manner, a left line-of-sight sensor 407 is disposed on an edge of the left opening portion 446 (left lens system 403), so as to be directed to the left eye facing the left opening portion 446. The left line-of-sight sensor 407 is disposed on the rear side of the left lens system 403, and light enters the left line-of-sight sensor 407 from the outside through the left lens system 403. The right line-of-sight sensor 406 and the left line-of-sight sensor 407 are sensitive only to red light, such as the 900 nm ±20 nm range, for example.

The right line-of-sight sensor 406 is disposed at the 9:00 position (position at 270° rotated clockwise from the position directly above), with the center of the right opening portion 445 (optical axis of the right lens system 402) as the center. The left line-of-sight sensor 407 is disposed at the 3:00 position (position at 90° rotated clockwise from the position directly above), with the center of the left opening portion 446 (optical axis of the left lens system 403) as the center. The right line-of-sight sensor 406 and the left line-of-sight sensor 407 are disposed approximately at the same height (vertical position). The right line-of-sight sensor 406 is disposed on the left side of the right opening portion 445 (near the right eye), and the left line-of-sight sensor 407 is disposed on the right side of the left opening portion 446 (near the left eye).

In this way, the right line-of-sight sensor 406 and the left line-of-sight sensor 407 are disposed on a horizontal line 485 passing through the optical axis of the right lens system 402 and the optical axis of the left lens system 403 (on a horizontal line passing through the center of the right opening portion 445 and the center of the left opening portion 446).

Normally the eyelids of a user (user wearing the head mounted display) open vertically. Therefore the right line-of-sight sensor 406 and the left line-of-sight sensor 407 are disposed such that the eyeballs are observed in the direction of the horizontal line 485, whereby the eyeballs are not shaded very much by the eyelids when the line-of-sight is detected, and the success rate of the line-of-sight detection can be improved.

In FIG. 13, a plurality of infrared light-emitting diodes (right IREDs) are disposed along the edge of the right opening portion 445 (right lens system 402) as a plurality of light sources to illuminate the eyeball (right eye). The right IREDs are disposed on the rear side of the right lens system 402, and emits light (infrared light) to the outside through the right lens system 402, and illuminate the eyeball (right eye). In the same manner, a plurality of light-emitting diodes (left IREDs) are disposed along the edge of the left opening portion 446 (left lens system 403) as a plurality of light sources to illuminate the eyeball (left eye). The left IREDs are disposed on the rear side of the left lens system 403, emit light (infrared light) to the outside through the left lens system 403, and illuminate the eyeball (left eye).

Around the right opening portion 445 (right lens system 402), right IREDs 408, 409 and 411 to 422 are disposed. With the center of the right opening portion 445 (optical axis of the right lens system 402) as the center, the right IRED 408 is disposed at the 10:00 position, the right IRED 409 at the 11:00 position, the right IRED 411 at the 1:00 position, the right IRED 412 at the 1:30 position, the right IRED 413 at the 2:00 position, and the right IRED 414 and the 2:30 position. Further, the right IRED 415 is disposed at the 3:00 position, the right IRED 416 at the 3:30 position, the right IRED 417 at the 4:00 position, the right IRED 418 at the 4:30 position, the right IRED 419 at the 5:00 position, the right IRED 420 at the 6:00 position, the right IRED 421 at the 7:00 position, and the right IRED 422 at the 8:00 position.

Around the left opening portion 446 (left lens system 403), left IREDs 423, 424 and 426 to 437 are disposed. With the center of the left opening portion 446 (optical axis of the left lens system 403) as the center, the left IRED 423 is disposed at the 2:00 position, the left IRED 424 at the 1:00 position, the left IRED 426 at the 11:00 position, the left IRED 427 at the 10:30 position, the left IRED 428 at the 10:00 position, and the left IRED 429 at the 9:30 position. Further, the left IRED 430 is disposed at the 9:00 position, the left IRED 431 at the 8:30 position, the left IRED 432 at the 8:00 position, the left IRED 433 at the 7:30 position, the left IRED 434 at the 7:00 position, the left IRED 435 at the 6:00 position, the left IRED 436 at the 5:00 position, and the left IRED 437 at the 4:00 position.

According to Embodiment 4, a number of light sources per degree (angle density) is the maximum in a range on the opposite side of the right line-of-sight sensor 406, with respect to the center of the right opening portion 445 (optical axis of the right lens system 402), just like Embodiment 1. In the same manner, a number of light sources per degree (angle density) is the maximum in a range on the opposite side of the left line-of-sight sensor 407, with respect to the center of the left opening portion 446 (optical axis of the left lens system 403). Thereby an effect similar to Embodiment 1 can be implemented.

The line-of-sight detection unit for the right eye is constituted of the right line-of-sight sensor 406, the right IREDs 408, 409 and 411 to 422, and a control circuit (not illustrated). In the same manner, the line-of-sight detection unit for the left eye is constituted of the left line-of-sight sensor 407, the left IREDs 423, 424 and 426 to 437, and a control circuit (not illustrated). The control circuit of the line-of-sight detection unit for the right eye and the control circuit for the line-of-sight detection unit for the left eye may be one common control circuit, or may be separate control circuits.

Figure 14:
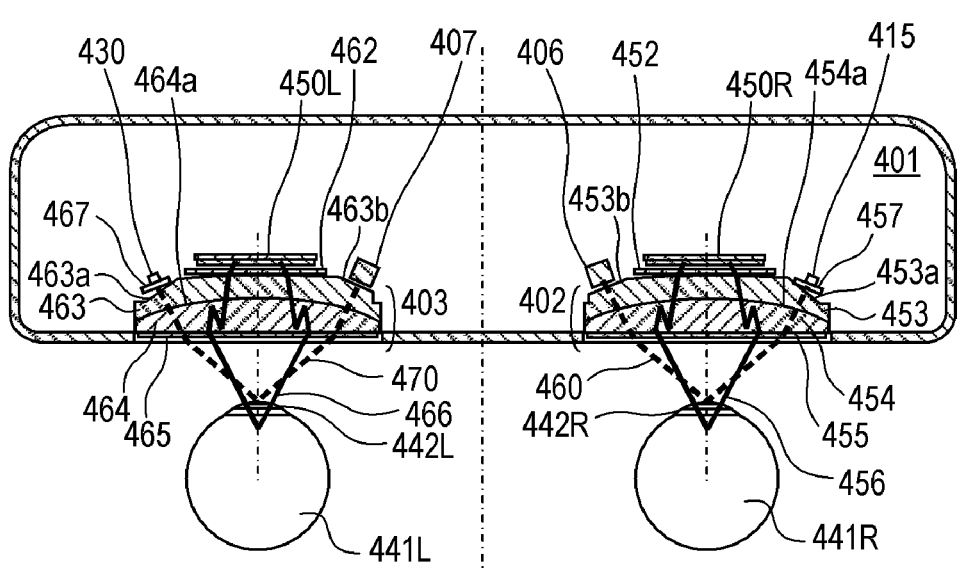
FIG. 14 is a cross-sectional view of the display unit main body according to Embodiment 4.

FIG. 14 indicates the disposition of the eyeballs (right eye 441R and left eye 441L) of the user looking into the display unit main body 401, and the display unit main body 401.

The right lens system 402 and the left lens system 403 are constituted of polarizing reflection optical systems. The polarizing reflection optical systems can be implemented using the technique disclosed in Japanese Patent Application Publication No. 2020-95205, for example.

A right display panel 450R is such a display panel as an organic EL panel, and is disposed on the rear side of the right lens system 402. The right eye 441R of the user views the right display panel 450R through the right lens system 402. In the same manner, a left display panel 450L is such a display panel as an organic EL panel, and is disposed on the rear side of the left lens system 403. The left eye 441L of the user views the left display panel 450L through the left lens system 403.

The right lens system 402 is constituted of a right polarizing panel 452, a right first lens 453, a right second lens 454 which includes a right polarizing half mirror 454a on one surface (surface on the side of the right first lens 453), and a right polarizing reflection plate 455. In the same manner, the left lens system 403 is constituted of a left polarizing panel 462, a left first lens 463, a left second lens 464 which includes a left polarizing half mirror 464a on one surface (surface on the side of the left first lens 463), and a left polarizing reflection plate 465. The surfaces on the user side of the right second lens 454 and the left second lens 464 are assumed to be flat surfaces.

The optical path of the right display panel 450R becomes a display optical path 456 which returns inside the right second lens 454. Reflection and transmission are controlled by the right polarizing panel 452, the right polarizing half mirror 454a, and the right polarizing reflection plate 455, whereby the display optical path 456 is implemented. In the same manner, the optical path of the left display panel 450L becomes a display optical path 466 which returns inside the left second lens 464. Reflection and transmission are controlled by the left polarizing panel 462, the left polarizing half mirror 464a, and the left polarizing reflection plate 465, whereby the display optical path 466 is implemented.

On the front side (user side) of the right IRED 415, a right mask 457, of which transmittance of the infrared light is higher than transmittance of the visible light, is disposed. Here the right mask 457 transmits the infrared light and does not transmit the visible light, but may transmit some visible light if the transmittances (shield factors) are considerably different between the visible light and the infrared light. In FIG. 14, the right mask 457 is illustrated in front of the right IRED 415, but is actually disposed between the right IREDs 408, 409 and 411 to 422, and the right first lens 453. In the same manner, on the front side (user side) of the left IRED 430, a left mask 467, of which transmittance of the infrared light is higher than transmittance of the visible light, is disposed. Here the left mask 467 also transmits the infrared light and does not transmit the visible light, but may transmit some visible light if the transmittances (shield factors) are considerably different between the visible light and the infrared light, just like the right mask 457. In FIG. 14, the left mask 467 is illustrated in front of the left IRED 430, but is actually disposed between the left IREDs 423, 424 and 426 to 437, and the left first lens 463.

The light emitted from the right IRED 415 transmits through the right lens system 402, is reflected by the right eye 441R, transmits through the right lens system 402 again, and enters the right line-of-sight sensor 406. This optical path is indicated as the right line-of-sight detection optical path 460. In the same manner, the light emitted from the left IRED 430 transmits through the left lens system 403, is reflected by the left eye 441L, transmits through the left lens system 403 again, and enters the left line-of-sight sensor 407. This optical path is indicated as a left line-of-sight detection optical path 470.

In FIG. 14, the light emitted from the right IRED 415 illuminates a cornea 442R and an iris (not illustrated) of the right eye 441R. The right line-of-sight sensor 406 acquires an iris image of the right eye 441R, and also acquires a mirror reflection image (Purkinje image) of the right IRED 415 that passes through the right line-of-sight detection optical path 460. Lights from other right IREDs also illuminate the cornea 442R and the iris of the right eye 441R in the same manner, although this is not illustrated in FIG. 14. Since a plurality of right IREDs illuminate a signal iris, the illumination unevenness of the iris is reduced.

In the same manner, the light emitted from the left IRED 430 illuminates a cornea 442L and an iris (not illustrated) of the left eye 441L. The left line-of-sight sensor 407 acquires an iris image of the left eye 441L, and also acquires a mirror reflection image (Purkinje image) of the left IRED 430 that passes through the left line-of-sight detection optical path 470. Lights from other left IREDs also illuminate the cornea 442L and the iris of the left eye 441L in the same manner, although this is not illustrated in FIG. 14. Since a plurality of left IREDs illuminate a single iris, non-uniformity of the illumination of the iris is reduced.

As illustrated in FIG. 14, in the surface of the right first lens 453 (surface on the right display panel 450R side), a portion facing the right IREDs 415 (a plurality of right IREDs), that is, an incident surface 453a, and a portion facing the right line-of-sight sensor 406, that is, an emission surface 453b, have different shapes. In the same manner, in the surface of the left first lens 463 (surface on the left display panel 450L side), a portion facing the left IREDs 430 (a plurality of left IREDs), that is, an incident surface 463a, and a portion facing the left line-of-sight sensor 407, that is, an emission surface 463b, have different shapes.

Figure 15:
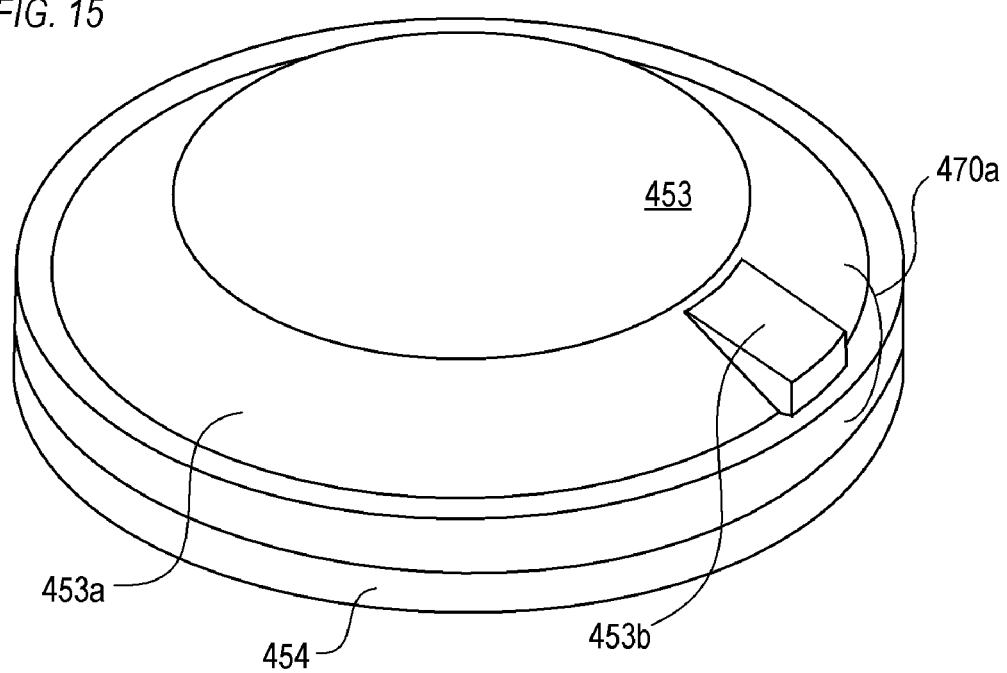
FIG. 15 is a perspective view of a lens according to Embodiment 4.

FIG. 15 is a perspective view of the right first lens 453 and the right second lens 454. The right first lens 453 basically has a shape of a rotating body, and the incident surface 453a is a conical surface. In the portion of the emission surface 453b, an optical correction portion 470a, which is similar to a triangular prism, is integrally formed on the conical surface. The emission surface 453b (surface facing the right line-of-sight sensor 406, surface of the optical correction portion 470a) is a plane (flat).

A triangular prism normally has a characteristic that a refracting angle changes depending on the wavelength. However the right IRED emits only light in a limited wavelength range (infrared light). The right line-of-sight sensor 406 also receives only light in a limited wavelength range (infrared light). Therefore the above mentioned characteristic of a triangular prism (characteristics that a refracting angle changes depending on the wavelength) can be ignored.

Here a case where the emission surface 453b is not flat but has curvature will be considered. In this case, optical aberration is generated in the light from the emission surface 453b, and the image received by the right line-of-sight sensor 406 deteriorates. By making the emission surface 453b flat, the optical aberration can be reduced. Further, the lights emitted from the IREDs are separated into diffuse reflection lights which illuminates a wide range of the iris and are reflected thereon, and mirror reflection lights which are mirror-reflected on the cornea. By making the emission surface 453b flat, a pupil image, in which optical aberration has been reduced, can be detected from the diffuse reflection light. The mirror reflection light can be handled as a reflection light of a point light source. Hence by making the emission surface 453b flat, the Purkinje image, in which optical aberration has been reduced, can be detected from a mirror reflection image. As a result, the line-of-sight can be detected at high precision from the pupil image and the Purkinje image.

Furthermore, in Embodiment 4, the portion of the incident surface 453a has a prism shape, hence a right mask 457 can be disposed. By disposing the right mask 457, the right IREDs are invisible when the user looks into the right lens system 402, and excellent aesthetics can be implemented.

The left eye side is the same as the right eye side. The left first lens 463 basically has a shape of a rotating body, and the incident surface 463a is a conical surface. In the portion of the emission surface 463b, an optical correction portion, which is similar to a triangular prism, is integrally formed on the conical surface. The emission surface 463b (surface facing the left line-of-sight sensor 407, surface of the optical correction portion) is a plane (flat). Thereby an effect similar to the right eye side can be acquired in the left eye side as well.

As mentioned above, according to Embodiment 4, the portion facing the line-of-sight sensor is flat on the surface of the display optical system. Thereby optical aberration of the image acquired by the line-of-sight sensor can be reduced, and precision of the line-of-sight detection can be improved.

Embodiment 5

Embodiment 5 of the present invention will now be described with reference to FIGS. 16 to 20. In Embodiment 5, an example of an imaging device (camera main body) equipped with a line-of-sight detection device will be described. The camera main body according to Embodiment 5 detects a line-of-sight of a user who looks into a finder (electronic view finder (EVF) unit), and captures an image of an object which exists in the front direction of the camera main body and the user. The front direction of the camera main body, which is parallel with the optical axis of an image capturing optical system, is assumed to be the Z axis (Z axis direction). A vertically upward direction with respect to the Z axis in a most basic standard attitude of the camera main body (normal position) is assumed to be the Y axis (Y axis direction). A direction vertical to the Y axis and the Z axis in the right hand system is assumed to be the X axis (X axis direction).

Figure 16:
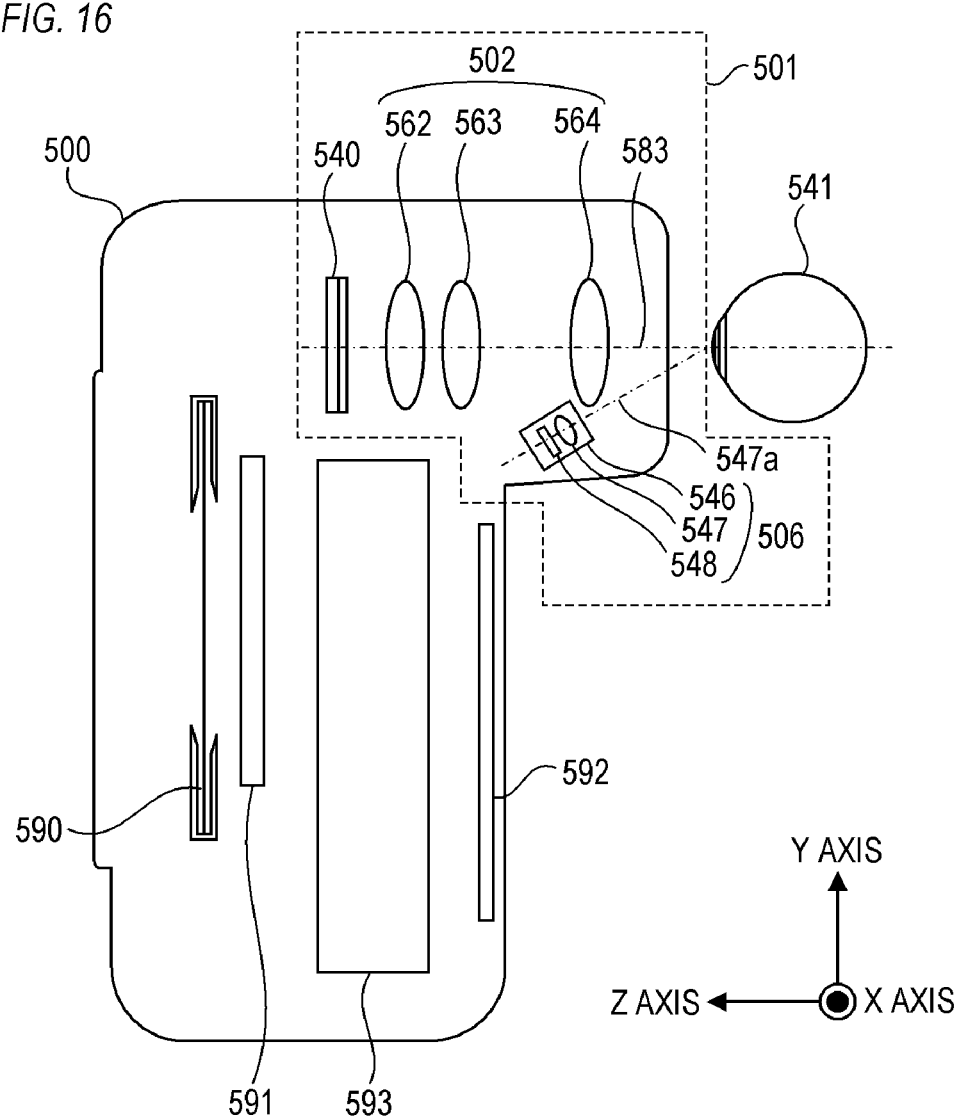
FIG. 16 is a cross-sectional view of a camera main body according to Embodiment 5.

FIG. 16 is a schematic cross-sectional view of a camera main body 500 according to Embodiment 5. FIG. 16 is a longitudinal cross-section at the center, when the camera main body 500 is sectioned at a plane parallel with the Y axis and the Z axis. In the camera main body 500, a shutter 590 and an imaging sensor 591 are disposed side-by-side on the optical axis of an image capturing optical system (not illustrated). The imaging sensor captures an image of an object which exists in the front direction of the camera main body 500. A rear monitor 592 is disposed on the rear surface of the camera main body 500. The rear monitor 592 displays menus and images to receive operations on the camera main body 500, and to view and edit images acquired by the camera main body 500. The rear monitor 592 is constituted of a liquid crystal panel or an organic EL panel with a backlight. Just like a standard camera, an EVF unit 501, the shutter 590, the imaging sensor 591 and the rear monitor 592 are controlled by a CPU 593, and perform various input/output processing of required information.

The EVF unit 501 includes an EVF panel 540 (display panel), an EVF lens system 502 (display optical system), and a line-of-sight sensor 506 (eyeball imaging portion). The EVF unit 501 is built-in or attached to the camera main body 500, so that the user of the camera main body 500 can view the display screen of the EVF panel 540. FIG. 16 indicates a state where the user is looking into the EVF unit 501 with the eyeball 541.

The EVF panel 540 is a display panel constituted of an organic EL panel or a liquid crystal display panel with a backlight. The EVF panel 540 is disposed so that the display screen is directed to the Z axis minus direction. The EVF lens system 502 is disposed in front of the display screen of the EVF panel 540, and is constituted of one or a plurality of lenses disposed along a display optical system optical axis 583 (optical axis of the display optical system (EVF lens system 502)), which extends in the Z axis minus direction. The lenses of the EVF lens system 502 are optical glass or transparent optical plastic lenses which are manufactured by cutting and grinding, or by molding. In FIG. 16, the EVF lens system 502 is constituted of three lenses (a G1 lens 562, a G2 lens 563 and a G3 eyepiece lens 564) which are optical lenses through which visible light transmits through. The number of lenses included in the EVF lens system 502 is not limited to 3, but may be 4 or 5, for example. The EVF lens system 502 can be configured by an appropriate number of lenses combined to magnify the display screen of the EVF panel 540.

The line-of-sight sensor 506 forms an image of the eyeball 541, looking into the EVF unit 501, on a line-of-sight sensor chip 548. The line-of-sight sensor 506 includes a line-of-sight sensor lens 547 and the line-of-sight sensor chip 548 housed inside a line-of-sight sensor lens casing 546. The line-of-sight sensor chip 548 is disposed on a line-of-sight sensor lens optical axis 547*a* (optical axis of the line-of-sight sensor lens). The line-of-sight sensor lens 547 is an optical system that is required to form an image of the eyeball 541 on the line-of-sight sensor chip 548, and is constituted of an appropriate optical lens. In FIG. 16, one lens is illustrated as the line-of-sight sensor lens 547, but the line-of-sight sensor lens 547 may include a plurality of lenses. The line-of-sight sensor chip 548 is an image sensor that A/D-converts the formed image of the eyeball 541 including infrared components, and inputs the result to the CPU 593. For the line-of-sight sensor chip 548, a CMOS imaging sensor or a CCD matrix sensor, for example, is used. The line-of-sight sensor 506 is a compact camera integrally packaging the above mentioned components, but these components may not be integrated.

Figure 17:
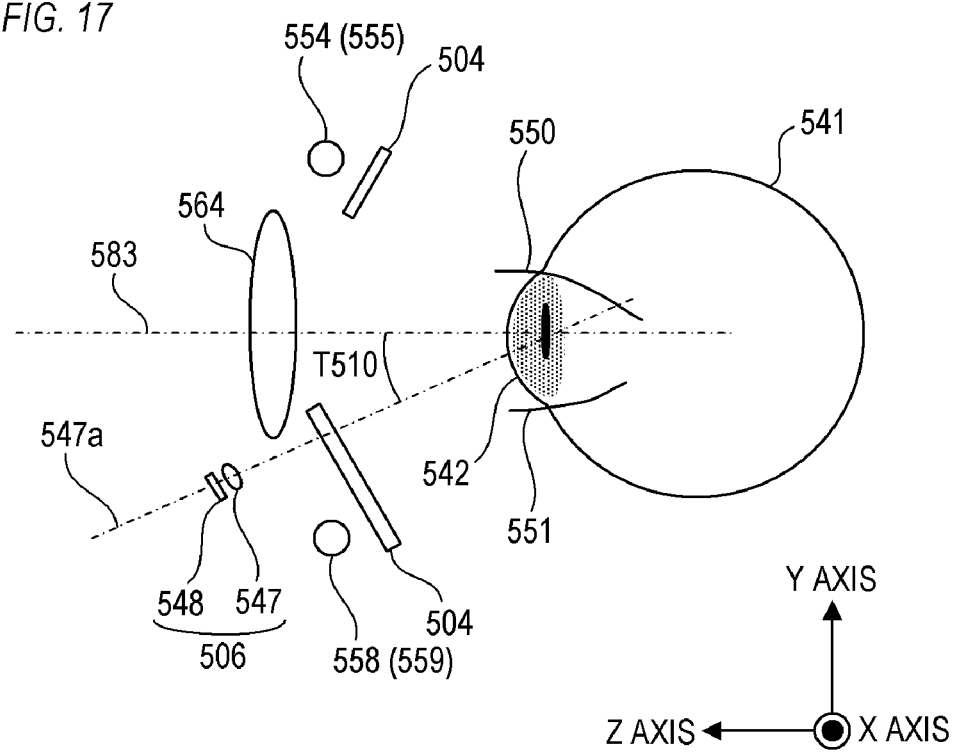
FIG. 17 is a cross-sectional view of the camera main body according to Embodiment 5.

The EVF unit 501 will be described in detail with reference to FIGS. 17 and 18. FIG. 17 is a schematic diagram depicting a part of the cross-section of the camera main body 500 (portion close to the eyeball 541). FIG. 18 is a schematic diagram viewing the EVF unit 501 from the eyeball 541 side, that is, a schematic diagram viewing the EVF unit 501 in the Z axis plus direction.

When the user looks into the display screen of the EVF panel 540, the eyeball 541 is located near the display optical system optical axis 583 of the G3 eyepiece lens 564, as illustrated in FIG. 17. The eyeball 541 is partially covered by an upper eyelid 550 and a lower eyelid 551, and the cornea 542 is exposed between the upper eyelid 550 and the lower eyelid 551. Here infrared light is emitted from the IREDs 552 to 561 disposed around the G3 eyepiece lens 564, and the eyeball 541 is illuminated by the infrared light.

An infrared transmission cover 504, made from a material (e.g. resin) which does not transmit (absorb) the visible light but transmits the infrared light, is disposed around the G3 eyepiece lens 564, and the IREDs 552 to 561 are concealed by this infrared transmission cover 504 so as to be invisible from the outside. In the infrared transmission cover 504, an opening portion 545, to pass an effective luminous flux of the visible light transmitted through the G3 eyepiece lens 564, is formed so that the display screen of the EVF panel 540 becomes visible. The opening portion 545 may or may not be a physical opening, as long as the visible light can be transmitted through. For example, the infrared transmission cover 504 may be made of an infrared transmitting coating material (coating material that does not transmit the visible light but does transmit the infrared light) coated on the G3 eyepiece lens 564. In this case, a spot where the infrared transmitting coating material is not coated is created, and this spot is used as the opening portion 545. Just like Embodiment 1, the transmittance of the visible light in the infrared transmission cover 504 is not limited to 0, and if the transmittance of the infrared light is higher than the transmittance of the visible light, the effect of making the IREDs 552 to 561 not very visible to the user can be implemented. Further, just like the case of Embodiment 1, it is preferable that the difference between the transmittance of the visible light and that of the infrared light is large.

Around the G3 eyepiece lens 564, a proximity sensor 549, to detect the approach of the eyeball 541, is disposed. The proximity sensor 549 is a unit which includes an infrared light irradiating portion and an infrared light receiving portion, and measures a distance between the G3 eyepiece lens 564 and the eyeball 541 using a reflection angle, time difference, and frequency of the illuminated infrared light, for example. The distance information measured by the proximity sensor 549 is sent to the CPU 593, and is used as information required for lighting control of the EVF panel 540 and the IREDs 552 to 561, for example. The proximity sensor 549 is also concealed by the infrared transmission cover 504.

The display optical system optical axis 583 and the line-of-sight sensor lens optical axis 547a are not parallel, but from an angle T510. For example, when the camera main body 500 is at a normal position, the line-of-sight 506 is located on the lower side of the display optical system optical axis 583, and the line-of-sight sensor lens optical axis 547a faces upward. The normal position can be regarded as an attitude, where the lateral direction of the eyeball 541 approximately matches with the lateral direction of the opening portion 545.

The eyeball 541 is partially covered by the upper eyelid 550 and the lower eyelid 551. As described in Embodiment 1, in most cases the upper eyelid 550 is larger and thicker than the lower eyelid 551. The camera main body 500 is more often used in the normal position. Therefore the line-of-sight sensor 506 is disposed so as to look up to the eyeball 541 from the lower eyelid 551 side in the normal position. Then compared with the case of disposing the line-of-sight sensor 506 so as to lock down to the eyeball 541 from the upper eyelid 550 side in the normal position, situations where the image of the eyeball 541, formed on the line-of-sight sensor chip 548, is shaded by an eyelid can be reduced.

As illustrated in FIG. 18, 10 IREDs 552 to 561 are disposed surrounding the periphery of a G3 eyepiece lens 564 (or opening portion 545). With the display optical system optical axis 583 as the center, the IRED 555 is disposed at the 1:00 position, the IRED 561 at the 1:30 position, the IRED 556 at the 2:00 position, the IRED 557 at the 3:00 position, and the IRED 558 at the 5:00 position. Further, the IRED 559 is disposed at the 7:00 position, the IRED 552 at the 9:00 position, the IRED 553 at the 10:00 position, the IRED 560 at the 10:30 position, and the IRED 554 at the 11:00 position. The line-of-sight sensor 506 is disposed at the 6:00 position. These positions are merely general positions thereof, and need not match exactly with the above clock positions.

According to Embodiment 5, a number of light sources (IREDs) per degree is the maximum in a range on the opposite side of the line-of-sight sensor 506, with respect to the center of the opening portion 545 facing the eye of the user, just like Embodiment 1. Here a horizontal line 585 in the X axis direction, passing through the display optical system optical axis 583, is focused. In FIG. 18, more IREDs are disposed on the side of the horizontal line 585 where the line-of-sight sensor 506 is not disposed (upper side), than the side of the horizontal line 585 where the line-of-sight sensor 506 is disposed (lower side). On the side where the line-of-sight sensor 506 is disposed (lower side of the horizontal line 585), 2 IREDs (IRED 558 and IRED 559) are disposed. On the side where the line-of-sight sensor 506 is not disposed (upper side of the horizontal line 585), 6 IREDs (IRED 553, IRED 554, IRED 555, IRED 556, IRED 560 and IRED 561) are disposed.

FIGS. 19A to 19D are schematic diagrams depicting a relationship of a plurality of IREDs, the eyeball 541 and the line-of-sight sensor 506. FIGS. 19A and 19B indicate a case where the IREDs 552 to 559 in FIG. 18 are used as the plurality of IREDs (Embodiment 5). FIG. 19A is a perspective view when the eyeball 541 is viewed from the G3 eyepiece lens 564 side, and FIG. 19B is a front view when the eyeball 541 is viewed from the G3eyepiece lens 564 side. FIGS. 19C and 19D indicate a case where IREDs 552b to 559b, which are disposed at even intervals, are used as the plurality of IREDs (comparative example). FIG. 19C is a perspective view when the eyeball 541 is viewed from the G3 eyepiece lens 564 side, and FIG. 19D is a front view when the eyeball 541 is viewed from the G3 eyepiece lens 564 side. The IREDs 560 and 561 are omitted here.

In FIGS. 19A to 19D, the eyeball 541 is located on the display optical system optical axis 583, viewing the EVF panel 540 in close proximity with the G3 eyepiece lens 564. The main light beams emitted from the IREDs 552 to 559 (552b to 559b) are reflected at reflection positions R552 to R559 (R552b to R559b), and enter the line-of-sight sensor 506. Among the reflection positions R552 to R559 (R552b to R559b), the reflection position on the cornea 542 is captured as Purkinje images in the images acquired by the line-of-sight sensor 506. Therefore by disposing many reflection positions on the cornea 542, precision of the line-of-sight detection can be improved.

In FIGS. 19A and 19B (Embodiment 5), 4 reflection positions (R552, R553, R556 and R557) are located on the cornea 542. The reflection positions R553 and R554 are located on the upper eyelid 550, and the reflection positions R558 and R559 are located on the lower eyelid 551. Therefore the reflection positions R553, R554, R558 and R559 are not captured as the Purkinje images in the images acquired by the line-of-sight sensor 506.

In FIGS. 19C and 19D (comparative example), the reflection positions R552b and R557b are also located on the lower eyelid 551. Therefore the reflection positions located on the cornea 542 are only the reflection positions R553b and R556b.

The line-of-sight sensor 506 is disposed so as to look up to the spherical cornea 542 from the lower position. As a result, as illustrated in FIG. 19D, the reflection positions of the main light beams emitted from the IREDs concentrate on the lower side of the cornea 542. This tendency becomes conspicuous in the case where the eye of the user is in close proximity with the EVF unit 501.

It is for this reason that more IREDs are disposed on the opposite side of the line-of-sight sensor 506, with respect to the display optical system optical axis 583 in Embodiment 5. Then the reflection positions, which concentrate on the lower side of the cornea 542, can be moved toward the center of the cornea 542, and situations where the main light beams are shaded by the lower eyelid 551 can be reduced.

In Embodiment 5, a plurality of IREDs are used, but in some cases lighting many IREDs at high output may not be desirable for the safety of the user. Lighting many IREDs all the time also increases power consumption of the camera main body 500. Therefore it is preferable not to light too many IREDs.

Figure 20:
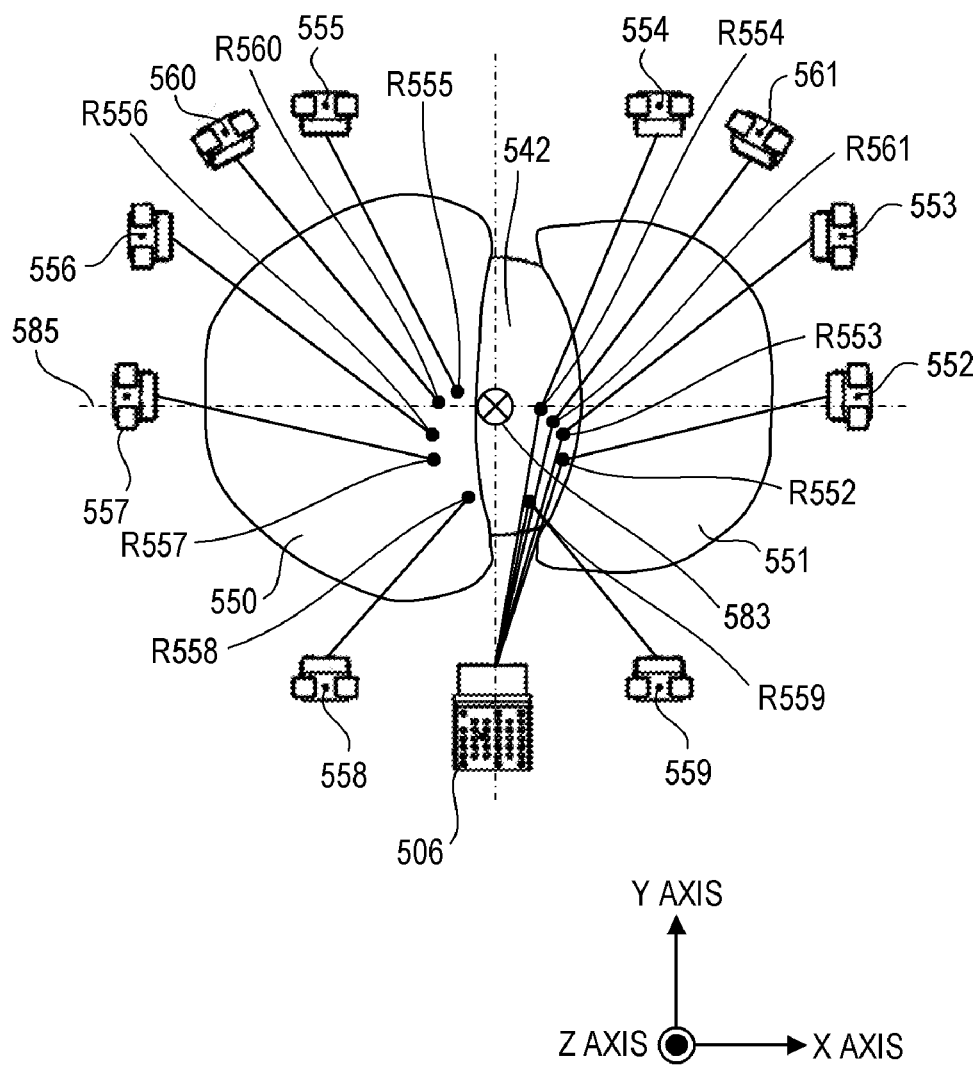
FIG. 20 is a front view indicating reflection positions of illumination light according to Embodiment 5.

FIG. 20 is a schematic diagram depicting a relationship between the eyeball 541 and the EVF unit 501 in a state where the user rotated the camera main body 500 counterclockwise by about 90°, that is, in the state where the user is looking into the EVF unit 501 that is in the vertical position. The vertical position can be regarded as an attitude in which the lateral direction of the eyeball 541 approximately matches with the longitudinal direction of the opening portion 545. FIG. 20 is a front view when the eyeball 541 is viewed from the EVF panel 540 side. The eyeball 541 is located on the display optical system optical axis 583. In FIG. 20, the camera main body 500 is indicated in the same manner as the normal position, and the eyeball 541 has been rotated counterclockwise by 90°. The rotating direction of the camera main body 500 is not limited to counterclockwise, and the following description is still applicable even in a case where the camera main body 500 is rotated clockwise.

In FIG. 20, reflection positions R555, R556, R557, R558 and R560, which correspond to the IREDs 555, 556, 557, 558 and 560 disposed on the upper eyelid 550 side respectively, are located on the upper eyelid 550. Therefore the reflection positions R555, R556, R557, R558 and R560 are not captured as Purkinje images in the images acquired by the line-of-sight sensor 506. On the other hand, reflection positions R552, R553, R554, R559 and R561, which correspond to the IREDs 552, 553, 554, 559 and 561 disposed on the lower eyelid 551 side, are located on the cornea 542. Therefore the reflection positions R552, R553, R554, R559 and R561 are captured as Purkinje images in the images acquired by the line-of-sight sensor 506. The shapes of the eyelids are different depending on the individual, but as mentioned above, the upper eyelid 550 tends to cover the eyeball 541 more than the lower eyelid 551.

As indicated in FIG. 20, in the case of the vertical position, it is preferable to light IREDs on the lower eyelid 551 side. However, it depends on the user whether the camera main body 500 is rotated clockwise or counterclockwise when an image is captured in the vertical position. Further, IREDs are used not only for acquiring Purkinje images, but also for the line-of-sight sensor 506 to capture the eyeball 541 and to secure general light quantity. Assuming various users and usage conditions, it is preferable to select IREDs to be lit symmetrically rather than asymmetrically.

Now FIG. 19B and FIG. 20 are compared. As illustrated in FIG. 19B, in the case of the normal position, the cornea 542, sandwiched between the upper eyelid 550 and the lower eyelid 551, is exposed laterally (the cornea 542 is exposed in a state where the width in the X direction is wide). As illustrated in FIG. 20, in the case of the vertical position, on the other hand, the cornea 542 is exposed longitudinally (the cornea 542 is exposed in a state where the width in the Y direction is wide), regardless the rotating direction of the camera main body 500.

Therefore in the case of the normal position, the lights emitted from the IREDs located at a distance on the plus or minus side of the Y axis (e.g. IREDs 554, 555, 558, 559) are less likely to be captured as the Purkinje images in the images acquired by the line-of-sight sensor 506. In the same manner, in the case of the vertical position, the lights emitted from the IREDs located at a distance on the plus or minus side of the X axis (e.g. IREDs 552, 553, 556, 557) are less likely to be captured as the Purkinje images in the images acquired by the line-of-sight sensor 506.

Therefore according to Embodiment 5, the CPU 593 controls each of the plurality of IREDs such that the IREDs to be lit are switched between the case of the normal position and the case of the vertical position. In the case of the normal position, the CPU 593 lights a first light source group which includes only the IREDs disposed on the upper side of the center of the opening portion 545, and in the case of the vertical position, the CPU 593 lights a second light source group which is different from the first light source group. A part of the plurality of IREDs is included in both the first light source group and the second light source group. For example, in the case of the normal position, the IREDs 552, 553, 556, 557, 560 and 561 are lit, and the other IREDs are not lit. In the case of the vertical position, the IREDs 554, 555, 558, 559, 560 and 561 are lit, and the other IREDs are not lit. The definition of the first light source group and the second light source group in Embodiment 5 is different from the definition of the first light source group and the second light source group in Embodiment 3.

Here the lights emitted from the IREDs 560 and 561 are more likely to be captured as the Purkinje images in the images acquired by the line-of-sight sensor 506, regardless the image capturing attitude of the user. Therefore the IREDs 560 and 561 are lit in both cases of the normal position and the vertical position. It is preferable that the IREDs disposed in the diagonal direction on the opposite side of the line-of-sight sensor 506, with respect to the display optical system optical axis 583 (IREDs disposed in a direction that passes the display optical system optical axis 583, and inclined from the Y axis by) 45°±10°, are constantly lit.

However a sufficient number of Purkinje images may not be acquired even if the IREDs to be lit are controlled in accordance with the attitude of the user, such as a case where the eyeball 541 is distant from the display optical system optical axis 583, or a case where the eyeball 541 is too close to the EVF unit 501. Hence in the case where a number of acquired Purkinje images (Purkinje images formed on the line-of-sight sensor 506) is less than a predetermined number, the CPU 593 may temporarily turn on one or more IREDs that were turned off, in accordance with the situation of the acquired Purkinje images. The predetermined number is a number that is sufficient for the line-of-sight detection, and is 2, for example. Thereby a number of Purkinje images to be acquired can be increased, and a frequency of generation of line-of-sight detection errors can be reduced.

As described above, according to Embodiment 5, a number of light sources per degree is the maximum in a range on the opposite side of the line-of-sight sensor, with respect to the center of the opening portion (optical axis of the display optical system) facing the eye of the user, just like Embodiment 1. Thereby an imaging device (line-of-sight detection device), which can detect a line-of-sight at high precision, regardless the situation, can be provided.

The above embodiments (including modifications) are merely examples, and configurations acquired by appropriately modifying or changing the configurations of the above embodiments, within the scope of the spirit of the present invention, are also included in the present invention. Further, configurations acquired by appropriately combining the configurations of the above embodiments are also included in the present invention. For example, image processing to enhance the contour of a focused region (focus peaking) may be combined with the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-208202, filed on Dec. 26, 2022, which is hereby incorporated by reference herein in its entirety.

What is claimed is:
1. A line-of-sight detection device comprising:
an image sensor disposed on an edge of an opening portion and configured to capture an image of an eye facing a lens disposed on the opening potion; and
a plurality of light sources disposed along the edge of the opening portion and arranged to illuminate the eye, wherein
a number of light sources disposed on opposite side of the image sensor with respect to an optical axis of the lens is more than a number of light sources disposed on same side of image sensor with respect to the optical axis, and light emitted from at least one of the plurality of light sources transmits through the lens, is reflected by the eye, transmits through the lens again, and enters the image sensor.

2. The line-of-sight detection device according to claim 1, wherein the opening portion includes an opening portion for a right eye and an opening portion for a left eye, each of an image sensor for the right eye, which is disposed on an edge of the opening portion for the right eye and is disposed to capture the right eye of a user from the left eye side, and an image sensor for the left eye, which is disposed on an edge of the opening portion lens for the left eye and is disposed to capture the left eye of the user from the right eye side, is included as the image sensor, and each of a plurality of light sources for the right eye disposed along the edge of the opening portion for the right eye and a plurality of light sources for the left eye disposed along the edge of the opening portion for the left eye is included as the plurality of light sources.

3. The line-of-sight detection device according to claim 1, wherein in a 360° range around the optical axis, a number of light sources disposed in a range on opposite side of the image sensor with respect to the optical axis is more than a number of light sources disposed in a rest range which is a range of 360° around the optical axis minus the range on the opposite side of the image sensor with respect to the optical axis.

4. The line-of-sight detection device according to claim 3, wherein the range on the opposite side of the image sensor with respect to the optical axis is a 90° range around the optical axis as a center in a direction opposite of the image sensor.

5. The line-of-sight detection device according to claim 1, wherein the image sensor is disposed on left side or right side of the lens.

6. The line-of-sight detection device according to claim 5, wherein the image sensor is disposed on a horizontal line passing through the optical axis.

7. The line-of-sight detection device according to claim 1, wherein a number of light sources disposed on lower side of the lens is more than a number of light sources disposed on upper side of the lens.

8. The line-of-sight detection device according to claim 7, wherein a number of light sources disposed on lower side of a horizontal line passing through the optical axis is more than a number of light sources disposed on upper side of the horizontal line.

9. The line-of-sight detection device according to claim 3, wherein a number of light sources disposed in the range on the opposite side of the image sensor with respect to the optical axis is at least 3 more than a number of light sources disposed in the rest range.

10. The line-of-sight detection device according to claim 1, further comprising a processor configured to control each of the plurality of light sources, wherein in a case where a lateral direction of the eye substantially matches with a lateral direction of the lens, the processor lights a first light source group which includes only light sources disposed on upper side of the optical axis of the lens.

11. The line-of-sight detection device according to claim 10, wherein in the case where the lateral direction of the eye substantially matches with the longitudinal direction of the lens, the processor lights a second light source group which is different from the first light source group, and a part of the plurality of light sources is included in both the first light source group and the second light source group.

12. The line-of-sight detection device according to claim 10, wherein in a case where a number of Purkinje images formed on the image sensor is less than a predetermined number, the processor temporarily lights at least one light source which is not lit.

13. A head mounted display device comprising:
the line-of-sight detection device according to claim 1;
the opening portion;
the lens; and
a display panel, wherein
the lens directs light from the display panel to the eye.

14. The line-of-sight detection device according to claim 3, wherein the range on the opposite side of the image sensor with respect to the optical axis is a 120° range with the optical axis as a center in a direction opposite of the image sensor.

15. The line-of-sight detection device according to claim 1, wherein the image sensor is configured to capture the image of the eye including a Purkinje image of at least one of the plurality of light sources and a pupil image of the eye.

16. The line-of-sight detection device according to claim 1, wherein a number of all light sources disposed on the edge of the opening portion is more than a number of all image sensors disposed on the edge of the opening portion.

17. The line-of-sight detection device according to claim 15, wherein the image sensor is disposed to left side or right side of all light sources disposed on the edge of the opening portion.

* * * * *